United States Patent
Das et al.

(10) Patent No.: US 7,600,010 B2
(45) Date of Patent: Oct. 6, 2009

(54) METHOD OF MANAGING COMMUNICATION BUFFERS EMPLOYING AN APPLICATION FRAMEWORK FOR A PLURALITY OF COMMUNICATION LAYERS AND NODE EMPLOYING THE SAME

(75) Inventors: Sujit R. Das, New Berlin, WI (US); Jose A. Gutierrez, Menomonee Falls, WI (US); Charles J. Luebke, Sussex, WI (US); Marco Naeve, Milwaukee, WI (US); Luis R. Pereira, Milwaukee, WI (US)

(73) Assignee: Eaton Corporation, Cleveland, OH (US)

( * ) Notice: Subject to any disclaimer, the term of this patent is extended or adjusted under 35 U.S.C. 154(b) by 1192 days.

(21) Appl. No.: 10/963,327

(22) Filed: Oct. 12, 2004

(65) Prior Publication Data

US 2006/0080455 A1 Apr. 13, 2006

(51) Int. Cl.
*G06F 15/173* (2006.01)
(52) U.S. Cl. .................. 709/223; 709/217; 709/219; 709/230
(58) Field of Classification Search ................ 709/216, 709/217, 219, 229, 230, 224, 223
See application file for complete search history.

(56) References Cited

U.S. PATENT DOCUMENTS

| 5,278,834 | A * | 1/1994 | Mazzola ................ 370/469 |
| 6,421,348 | B1 * | 7/2002 | Gaudet et al. ............. 370/401 |
| 6,480,507 | B1 * | 11/2002 | Mercer et al. ............. 370/469 |
| 2002/0176430 | A1 * | 11/2002 | Sangha et al. ............. 370/412 |
| 2004/0045007 | A1 * | 3/2004 | Boland et al. ............. 719/315 |
| 2004/0073724 | A1 * | 4/2004 | Wilson et al. ............. 710/52 |

OTHER PUBLICATIONS

Miro Samek, quantum-leaps.com—Resources "Home-<Quantum Resources", http://www.quantum-leaps.com/resources.htm, 2002, 1 p.
Miro Samek, quantum-leaps.com—Products and Services "Home-<Products & Services", http://www.quantum-leaps.com/com.htm, 2002, 1 p.
Miro Samek, Quantum Community "Practical Statecharts in C/C++ Quantum Programming for Embedded Systems", http://www.quantum-leaps.com/writings/book.htm, 2002, 12 pp.

(Continued)

*Primary Examiner*—Frantz B Jean
(74) *Attorney, Agent, or Firm*—Martin J. Moran

(57) ABSTRACT

A method of network communication includes employing a communication network protocol stack having a plurality of independent communication layers providing a plurality of different corresponding services. A buffer manager is employed for a plurality of communication buffers. The buffer manager is independent of the independent communication layers. An application framework provides asynchronous communications among the buffer manager and the independent communication layers. For a plurality of pairs of the buffer manager and one of the independent communication layers and for a plurality of pairs of the independent communication layers, the method provides subscribing by the buffer manager and by the independent communication layers to a plurality of events through the application framework and publishing by the buffer manager and by the independent communication layers a plurality of corresponding events through the application framework.

20 Claims, 12 Drawing Sheets

OTHER PUBLICATIONS

Miro Samek, quantum-leaps.com—Glossary "Quantum Glossary", http://www.quantum-leaps.com/glossary.htm, 2002, 11 pp.

Miro Samek, Practical Statecharts "The in-depth resource for state machines and active objects", http://www.quantum-leaps.com/, 2002, 2 pp.

Miro Samek, Quantum Community "Home-<Quantum Framework-<Overview", http://www.quantum-leaps.com/qf/overview.htm, 2002, 2 pp.

Miro Samek, Practical Statecharts "Home-<About State Machines", http://www.quantum-leaps.com/about.htm, 2002, 2 pp.

Indiana University, "ISO/OSI Network Model", http://www.uwsg.indiana.edu/usail/network/nfs/network_layers.html, 2004, 3 pp.

Miro Samek, "Home-<Quantum Framework->Overview", http://www.quantum-leaps.com/qf/overview.htm, 2002, 2 pp.

Samek, P., "Practical Statecharts in C/C++: Quantum Programming for Embedded Systems", CMP Books, 2002, pp. 187-191.

* cited by examiner

```
for(U8 i=0;i<BUFFCOUNT;i++)
    BMEBuffers[i]->GEN(buf_msg_ReleaseBuffer(IAPP, 0xff));
    BMEBuffers[i]->buf_esv_myNmbr=i+1;
```

<BME_MANAGER>

BME_RequestBuffer[params->buffNmbr==0]/
bme_SearchFreeBuffer(params->layer, params->requestedSize, params->buffType, params->buffNmbr);

BME_RequestBuffer[params->buffNmbr !=0]/
if(BMEBuffers[params->buffNmbr - 1]->IS_IN(BUF_GRANTED))
{
    BMEBuffers[params->buffNmbr - 1]->GEN(buf_msg_RequestBuffer(params->layer, params->requestedSize, params->buffType, params->buffNmbr));
}
else
{
    bme_PublishBufferReply(params->layer, 0, 0, 0);//error
}
return 0;

BME_ReleaseBuffer/
U8 i;
if((params->buffNmbr==0xff) && (params->layer==IAPP))/release all buffers in case of a app reset

FIG.2B1

```
         for(i=0;i<BUFFCOUNT;i++)
         ~
             BMEBuffers[i]->GEN(buf_msg_ReleaseBuffer(params->layer, params->buffNmbr));
         ~
     ~
         BMEBuffers[params->buffNmbr - 1]->GEN(buf_msg_ReleaseBuffer(params->layer, params->buffNmbr));
     else
     ~
     return 0;

BME_UpdateBuffer/
if(BMEBuffers[params->buffNmbr - 1]->buf_esv_myBufType==RECV)
~
    BMEBuffers[params->buffNmbr - 1]->GEN(buf_msg_UpdateBuffer(params->layer, params->buffNmbr,
    params->sizeConsumed,params->newBufType));
    return 0;
~
```

FIG.2B2

METHOD OF MANAGING COMMUNICATION BUFFERS EMPLOYING AN APPLICATION FRAMEWORK FOR A PLURALITY OF COMMUNICATION LAYERS AND NODE EMPLOYING THE SAME

CROSS-REFERENCE TO RELATED APPLICATION

This application is related to commonly assigned, concurrently filed:

U.S. patent application Ser. No. 10/963,140, filed Oct. 12, 2004, entitled "Method Of Managing Communication Buffers For A Plurality Of Communication Layers And Node Employing The Same".

BACKGROUND OF THE INVENTION

1. Field of the Invention

This invention pertains generally to methods of communication and, more particularly, to such methods employing a plurality of communication layers and communication buffers. The invention also relates to a communicating node including a plurality of communication layers and communication buffers.

2. Background Information

In order to better achieve flexibility to carry many different types of information over a single system, communication systems are designed with a layered architecture. One example of a general layered architecture for networking protocols and distributed applications is the International Standard Organization's Open System Interconnect (ISO/OSI) model.

The ISO/OSI model comprises a communication system having seven layers which form a communication path between a first end user and a second end user. The seven layers may be divided into two sets: (1) a set of upper layers; and (2) a set of lower layers. The upper four layers (e.g. transport, session, presentation and application layers) normally reside in application end users. A communication system may, in some cases, be defined by the lower three layers, individually known as the network layer, the data link layer and the physical layer.

Each layer is responsible for specific, defined operations in the communication process between application end users. In furtherance of these operations, each layer may communicate information with the layers above and below it through defined interfaces (although there is not always a definitive separation between layers). Thus, for example, the transport layer may operate independently of the specific operational details of the network layer, the data link layer and the physical layer below it. The set of lower layers thus operates as a transparent data pipeline to an application end user connected to the system at the transport layer interface.

A flow of data occurs between layers such as may occur during communication between two application end users. Information may be passed between like layers of each end user through a path ultimately connected at the physical layer. The rules that govern how data is passed between like layers at each end user are collectively referred to as a "peer-to-peer protocol." A variety of different application end users operating with different peer-to-peer protocols may communicate over a communication system so long as each application end user presents the proper upper layer interface to the communication system. Conversely, an application end user may connect with any communication system having a compatible lower layer interface.

Generally, it is common that only a subset of the seven layers are employed within a network or that one or more layers are merged. Each layer employs the services of the layer below it and provides services to the layers above it. Thus, for example, the network layer, which is responsible for establishing and maintaining the flow of messages between connected points in the network, is dependent upon the data link layer to provide, for example, character and message synchronization and error correction. The data link layer is, in turn, dependent upon the physical layer to actually transmit and receive information as electrical or wireless signals on the network.

Communication stacks are often implemented in a layered structure, with each layer providing a certain function. This allows some flexibility in the implementation, enables compliance with existing standards and permits a certain degree of customization. This also enables an application to become independent from the communication mechanism and allows relatively faster implementation thereof.

A wireless node in a low-rate network supports a set of communication layers, in order to enable it to communicate with other peer wireless nodes in the network. The protocol stack has several layers (e.g., physical; medium access control (MAC) sub-layer of the data link layer; network; application support layer (e.g. transport layer; session layer; presentation layer); application layer), in order to provide different corresponding services. A key challenge in implementing a low-rate wireless communication stack in a relatively low-cost, embedded environment is the limited resources that are available, especially when using off-the-shelf components, since each layer needs sufficient memory to adequately process incoming and outgoing messages.

Quantum Programming (QP) is a programming paradigm that extends traditional object-oriented programming (OOP) with two additional fundamental concepts: (1) hierarchical state machines, and (2) active object-based computing. See http://www.quantum-leaps.com/glossary.htm. These two concepts complement encapsulation, inheritance, and polymorphism.

The quantum analogy of QP consists of two elements. First, reactive software systems are analogous to quantum systems in that they are always found in strictly defined discrete states (i.e., quantum states) and can change their state only by means of uninterruptible run-to-completion (RTC) steps (i.e., quantum leaps). The states are naturally hierarchical and must comply with the Liskov Substitution Principle (LSP) for states. State nesting is fundamental and it expresses various symmetries within the system. Second, the hierarchical state machines interact with one another according to the active object-based computing model, which is analogous to the way particles interact in the quantum field theory. The only interaction allowed among reactive objects (i.e., hierarchical state machines) is the explicit exchange of event instances (i.e., intermediate virtual particles). The quantum model of interaction corresponds to the publish-subscribe model in software.

Quantum Framework (QF) is a minimal realization of an active object-based application framework specialized for embedded real-time systems. QF is a publish-subscribe architecture based on the quantum analogy of Quantum Programming. See Samek, M., Practical Statecharts in C/C++: Quantum Programming for Embedded Systems, CMP Books, 2002, pp. 187-91.

QF seeks to avoid all potentially risky (e.g., semaphores; monitors; condition variables; signals; other mechanisms employed in multitasking environments) programming techniques internally, but does not limit the application designer to only these techniques. QF has a relatively small memory footprint (e.g., about 5 Kbytes) and executes applications deterministically. QF is marketed royalty-free by Miro Samek of Palo Alto, Calif. at www.quantum-leaps.com, and can be embedded in commercial products. See Samek, M., Practical Statecharts in C/C++: Quantum Programming for Embedded Systems.

QF supports, for example, publish-subscribe event delivery, automatic garbage collection for events and timeout events. The framework is relatively very compact, typically taking up less than about 4 Kbytes of code and data. QF is employed, for example, in embedded real-time systems.

A main job of QF is to manage the time and computer resources of a microprocessor to ensure that all time critical events are handled as efficiently as possible. In contrast to a traditional real-time operating system (RTOS), QF is an application framework, which means that QF provides an overall reusable architecture for applications derived from it. In a RTOS, there is a main body of the application that calls various RTOS services. In contrast, with QF, a main application skeleton provided by the framework is employed and the code it calls is added.

QF applications consist of independent elements called active objects that collaborate to collectively deliver the intended functionality. Active objects in QF are encapsulated tasks (each embedding an event queue and a state chart) that communicate with one another asynchronously by sending and receiving events. Within an active object, events are processed sequentially in a run-to-completion (RTC) fashion, while the framework encapsulates all the details of thread-safe event exchange and queuing. RTC does not mean that any given active object has to monopolize the processor until the RTC step is complete. In a multitasking environment, higher-priority active objects (or more generally higher-priority tasks or interrupts) can be running, possibly preempting the currently executing active object. As long as active objects do not share resources, there are no concurrency hazards (e.g., race conditions; deadlocks; priority inversions). As a result, applications are coded with purely sequential techniques, without employing semaphores, monitors, condition variables, signals or other such mechanisms that are indispensable in conventional RTOS-based applications. State machines are employed to decompose the behavior of an active object into separate chunks (states) that are coded and tested independently.

QF is a minimal implementation of an active object-based framework that is not biased toward mechanical code generation and does not include facilities for animation or instrumentation of state machines, although such facilities may be added. Furthermore, QF does not support such advanced, but expensive, features as recursive de-composition of active objects, multiple active object interfaces (ports), or protocol state machines that restrict certain event types and sequences from leaving and entering an active object. Instead, QF implements only the most basic active object-based computing model limited to asynchronous event exchange and a single level of decomposition of active objects.

QF internally employs some form of multitasking, in order to interleave the execution of concurrent active objects. Moreover, the underlying tasking model is preemptive if higher-priority active objects are to preempt lower-priority ones for timely processing of urgent events. QF may employ a relatively small preemptive kernel, thereby obviating the need for an external RTOS component. As a result, the RTC processing and the absence of a need for blocking of active objects allows QF to work with a very special class of preemptive kernels that utilize only a single stack for all tasks and interrupts.

It is known to provide as an "application framework" a set of cooperating classes that makes up a reusable design for a specific class of software. A framework provides architectural guidance by partitioning design into abstract classes and defining their responsibilities and collaborations. A developer customizes the framework to a particular application by subclassing and composing instances of framework classes. See Gamma, Erich, et al., Design Patterns, Elements of Reusable Object-Oriented Software, Addison-Wesley, 1995, ISBN 0-201-63361-2.

There is room for improvement in methods employing a plurality of communication layers and communication buffers. There is also room for improvement in communicating nodes including a plurality of communication layers and communication buffers.

SUMMARY OF THE INVENTION

These needs and others are met by the present invention, which employs an application framework to provide asynchronous communications among a buffer manager and a plurality of independent communication layers. For a plurality of pairs of the buffer manager and one of the independent communication layers and for a plurality of pairs of the independent communication layers, the buffer manager and the independent communication layers subscribe to a plurality of events through the application framework and publish by the buffer manager and by the independent communication layers a plurality of corresponding events through the application framework.

In accordance with one aspect of the invention, a method of network communication comprises: employing a communication network protocol stack comprising a plurality of independent communication layers providing a plurality of different corresponding services; employing a plurality of communication buffers; employing a buffer manager for the communication buffers, the buffer manager being independent of the independent communication layers; employing an application framework providing asynchronous communications among the buffer manager and the independent communication layers; and for a plurality of pairs of the buffer manager and one of the independent communication layers and for a plurality of pairs of the independent communication layers, subscribing by the buffer manager and by the independent communication layers to a plurality of events through the application framework and publishing by the buffer manager and by the independent communication layers a plurality of corresponding events through the application framework.

The method may include publishing by one of the independent communications layers an indication to another one of the independent communication layers through the application framework.

The method may include publishing by one of the independent communications layers a request to the buffer manager through the application framework; and publishing by the buffer manager a response to the one of the independent communications layers through the application framework.

The method may include subscribing by the buffer manager to a request from one of the independent communications layers through the application framework; and subscribing by the one of the independent communication layers to a response from the buffer manager through the application framework.

The method may include subscribing by the buffer manager to a request from one of the independent communications layers through the application framework; publishing the request from one of the independent communications layers through the application framework to the buffer manager; subscribing by the one of the independent communication layers to a response from the buffer manager through the application framework; and publishing the response from the buffer manager through the application framework to the one of the independent communications layers.

The method may further include with the request a buffer request for a transmit buffer or a receive buffer of one of the communication buffers.

The method may further include with the response an identification of one of the communication buffers from the buffer manager.

The method may further include with the request a buffer release to release one of the communication buffers.

The method may include subscribing by one of the independent communications layers to an indication from another one of the independent communication layers through the application framework; and publishing the indication from another one of the independent communications layers through the application framework to the one of the independent communication layers.

The method may asynchronously communicate the publishing directly to the application framework from one of the independent communication layers; and asynchronously communicate the publishing directly from the application framework to another one of the independent communication layers.

As another aspect of the invention, a node comprises: a processor comprising a memory, a transceiver, a communication routine and an application framework, wherein the memory includes a plurality of communication buffers, wherein the communication routine includes a buffer manager adapted to manage the communication buffers, a plurality of independent communication layers and a physical layer associated with the transceiver, the buffer manager being independent of the independent communication layers, wherein the application framework provides asynchronous communications among the buffer manager and the independent communication layers, and wherein for a plurality of pairs of the buffer manager and one of the independent communication layers and for a plurality of pairs of the independent communication layers, the communication routine subscribes to a plurality of events by the buffer manager and the independent communication layers through the application framework and publishes a plurality of corresponding events by the buffer manager and by the independent communication layers through the application framework.

The communication routine may further include a radio frequency hardware abstraction; the physical layer may communicate directly with the radio frequency hardware abstraction; and the radio frequency hardware abstraction may communicate with the transceiver.

BRIEF DESCRIPTION OF THE DRAWINGS

A full understanding of the invention can be gained from the following description of the preferred embodiments when read in conjunction with the accompanying drawings in which:

FIGS. 2B1-2B2 form a block diagram of the state machine of the buffer manager of FIG. 2A.

DESCRIPTION OF THE PREFERRED EMBODIMENTS

As employed herein, the term "wireless" shall expressly include, but not be limited to, radio frequency, infrared, wireless area networks, IEEE 802.11 (e.g., 802.11a; 802.11b; 802.11g), IEEE 802.15 (e.g., 802.15.1; 802.15.3, 802.15.4), other wireless communication standards, DECT, PWT, pager, PCS, Wi-Fi, Bluetooth™, and cellular.

As employed herein, the term "portable communicating device" shall expressly include, but not be limited to, any portable communicating device having a wireless communication port (e.g., a handheld device; a handheld personal computer (PC); a portable or laptop PC; a Personal Digital Assistant (PDA); a mobile or cellular telephone; a wireless Internet device; a protocol-enabled telephone; a portable wireless device).

As employed herein, the term "network coordinator" (NC) shall expressly include, but not be limited to, any communicating device, which operates as the central controller in an ad-hoc communication network.

As employed herein, the term "network device" (ND) shall expressly include, but not be limited to, any communicating device (e.g., a portable communicating device; a fixed communicating device, such as, for example, switches, motion sensors or temperature sensors as employed in a wirelessly enabled sensor network), which participates in an ad-hoc communication network, and which is not a central controller.

As employed herein, the term "node" includes NDs, NCs and other communicating devices.

As employed herein, the term "application framework" means "Quantum Framework"; an active object-based framework; a real time event driven state machine based application framework for embedded systems; an interrupt driven framework; an object exchange framework; a layer support framework; and/or other suitable frameworks providing asynchronous communications among a buffer manager and a plurality of independent communication layers.

For convenience of disclosure, the following acronyms are employed herein:
APP: application layer
APS: application support layer
NWK: network layer
MAC: medium access sub-layer
PHY: physical layer The present invention is described in association with a wireless node 80 (FIG. 3), although the invention is applicable to a wide range of communicating devices.

Figure 1:
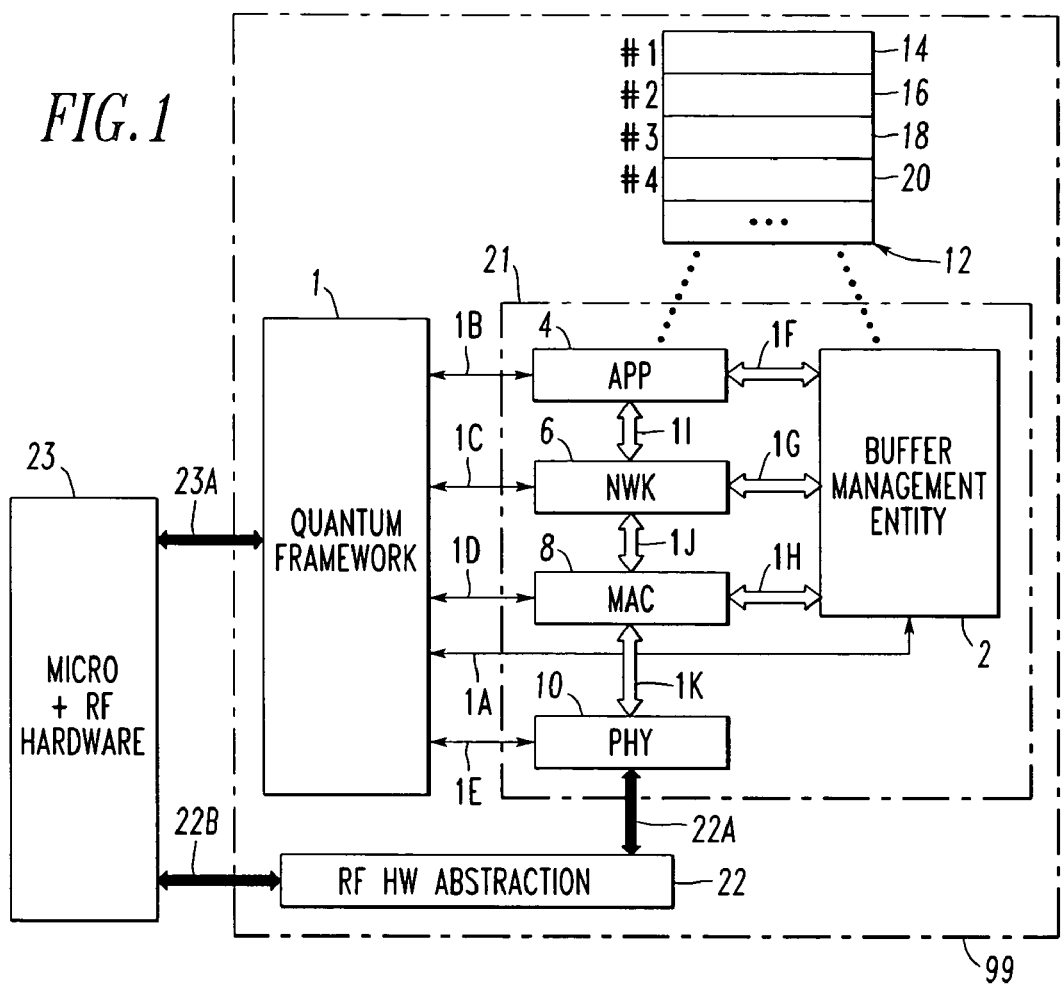
FIG. 1 is a block diagram of a buffer management entity (BME) and Quantum Framework (QF) in accordance with the present invention.

Referring to FIG. 1, high level interaction is shown between a suitable application framework, such as Quantum Framework (QF) 1, a buffer management entity (BME) 2 and a plurality of communication layers, such as the application (APP) layer 4, the network (NWK) layer 6 and the MAC sub-layer 8 (hereinafter referred to as "MAC layer 8") (e.g., which MAC sub-layer 8 may be all or part of a data link layer (not shown)). There is also a physical (PHY) layer 10 that interfaces with the MAC layer 8. The BME 2 functions as a buffer manager for a plurality of communication buffers 12 and is independent of the communication layers 4,6,8,10. As will be explained, the layers 4,6,8 request one or more of the communication buffers 12 from the BME 2 and release those requested buffers back to the BME after they are "consumed" (e.g., for a TX buffer, the message has been fully transmitted; for an RX buffer, the message has been considered by all layers and is no longer needed by the APP layer 4; a buffer no longer serves a useful purpose).

Although example communication layers 4,6,8,10 are shown, fewer layers or one or more additional layer(s) may be employed. Also, an APS (not shown) may be included as a separate layer (e.g., between layers 4 and 6) or as part of the APP layer 4.

The BME 2, therefore, provides a mechanism for managing the communication buffers 12 for the communication layers 4,6,8. Briefly, the management mechanism includes: (1) requesting by one of the communication layers 4,6,8 one of the communication buffers 12 from the BME 2; (2) responsive to this requesting, receiving at the requesting one of the communication layers 4,6,8 an identification of the requested one of the communication buffers 12 from the BME 2; (3) employing (e.g. for transmitting or receiving a message frame) the requested one of the communication buffers 12 at one of the communication layers 4,6,8,10; and (4) releasing by one of the communication layers 4,6,8 the requested one of the communication buffers 12 to the BME or indicating by one of the communication layers 4,6,8 the requested one of the communication buffers 12 to another one of the communication layers 4,6,8,10.

The BME 2 employs at least enough memory for the communication buffers 12 to store two message frames (e.g., one transmit buffer 14 and one receive buffer 16) of the largest possible size as defined by the communication protocol that employs the BME management mechanism. However, in order to accommodate incoming and outgoing messages without losing any of them, the BME 2 preferably has at least four buffers 14,16,18,20. Each of the buffers 14,16,18,20 can become a transmit buffer or a receive buffer depending on the needs imposed by the message traffic, although certain rules may apply. If, for example, the BME 2 has four buffers, then there is preferably one transmit buffer, one receive buffer, one dedicated MAC buffer, and a "spare" buffer.

Each of the layers, such as 4,6,8 (e.g., typically the MAC layer 8 and higher), which can send messages to a neighboring communicating device (not shown), can request one of the communication buffers 12 for creating a message frame.

The independent BME 2 and the independent layers 4,6,8, 10 form a communication network protocol stack 21 to provide network communication with a plurality of different corresponding services. The QF 1 provides asynchronous communications on interfaces 1A and 1B, 1C, 1D, 1E among the BME 2 and the independent communication layers 4,6,8, 10, respectively. In turn, the QF 1 provides asynchronous logical communications on logical interfaces 1F,1G,1H,1I, 1J,1K.

As will be discussed in greater detail, below, in connection with FIGS. 4A-4P, 5A-5M and 6A-6I, for a plurality of pairs of the BME 2 and one of the independent communication layers 4,6,8,10 and for a plurality of pairs of the independent communication layers 4,6,8,10, the QF 1 provides for subscribing by the BME 2 and by the independent communication layers 4,6,8,10 to a plurality of events through the QF 1 and provides for publishing by the BME 2 and by the independent communication layers 4,6,8,10 a plurality of corresponding events through the QF 1.

FIG. 1 also shows a radio frequency (RF) hardware (HW) abstraction 22 and a microprocessor and RF hardware circuit 23. The RF HW abstraction 22 communicates with the PHY layer 10 through a suitable synchronous interface 22A and with the circuit 23 through another suitable synchronous interface 22B. The circuit 23 communicates with the QF 1 through a further suitable synchronous interface 23A.

EXAMPLE 1

For the BME 2 and the layers 4,6,8,10, internal messages (or events) are passed among the various layers 4,6,8,10 using the QF 1. If, for example, the MAC layer 8 needs one of the buffers 12, then it generates a BME buffer request event, which is then passed to the BME 2 by the QF 1.

Each of the layers 4,6,8,10 of the network protocol stack 21 and the BME 2 are preferably implemented as self-contained independent software modules. Each independent software module only knows the software services provided by other software modules and how to invoke such a service. Each software module's services do not know or depend on a particular implementation of services of other layers. With such a modular design, each software module offers a set of related services in a self-contained manner. Such a decoupled architecture makes each module less prone to failure propagation from one module to another. Individual modules can coexist and be integrated with minimal effort to compatible modules for easy upgradeability of the system. The architecture favors easy reusability of existing modules for other future low-rate wireless applications.

The independent software modules are designed using a software architectural framework employing the modular QF 1. The modular QF 1 passes asynchronous events and permits each of the communication layers 4,6,8,10 to have a modular design in order to be reusable with other design-compatible layers. Services are invoked by employing the QF 1 rather than function calls.

The network protocol stack 21 employs object-oriented embedded software technology and asynchronous communication mechanisms provided by the QF 1 to modularize the protocol stack 21. A module communicates with a counterpart module asynchronously via the QF 1. This communication mechanism makes the modules logically communicate with each other (e.g., a module communicates directly with the QF 1 on one of the asynchronous interfaces 1B,1C,1D,1E and the QF 1, in turn, communicates directly with the recipient module on another one of those asynchronous interfaces 1B, 1C, 1D, 1E) reliably and efficiently. For example, the module for the APP layer 4 communicates directly with the QF 1 on the asynchronous interface 1B and the QF 1, in turn, communicates directly with the recipient module (e.g., for the NWK layer 6) on the asynchronous interface 1C.

EXAMPLE 2

The BME 2 can grant buffer requests either on a first-come-first-served basis or based upon certain rules depending on the incoming and outgoing traffic flow. The employed rules may favor a direction (i.e., incoming; outgoing) or may try to balance the number of transmit and receive buffers. After an outgoing message is sent successfully, the buffer is released again and a different one of the layers 4,6,8 may request its use. Incoming messages are stored in a receive buffer. When a new message is received, a new buffer is made available immediately for the next incoming message. After the newly received message is consumed by its intended layer, the buffer is released and is made available for the other layers to use.

EXAMPLE 3

The application layer 4 may request a transmit buffer for sending application data. The network layer 6 may request a transit buffer for sending a network layer command frame. The MAC layer 8 may request a transmit buffer for sending a MAC command frame. The physical layer 10 does not directly interact with the BME 2, since that layer does not need to send any command messages on its own and since it does not know when a buffer for a transmitted message can be released because the MAC layer 8 is responsible for reliable message transmission. Instead, the physical layer 10 reads and writes to the buffers 12 as assigned by the MAC layer 8.

Figure 2A:
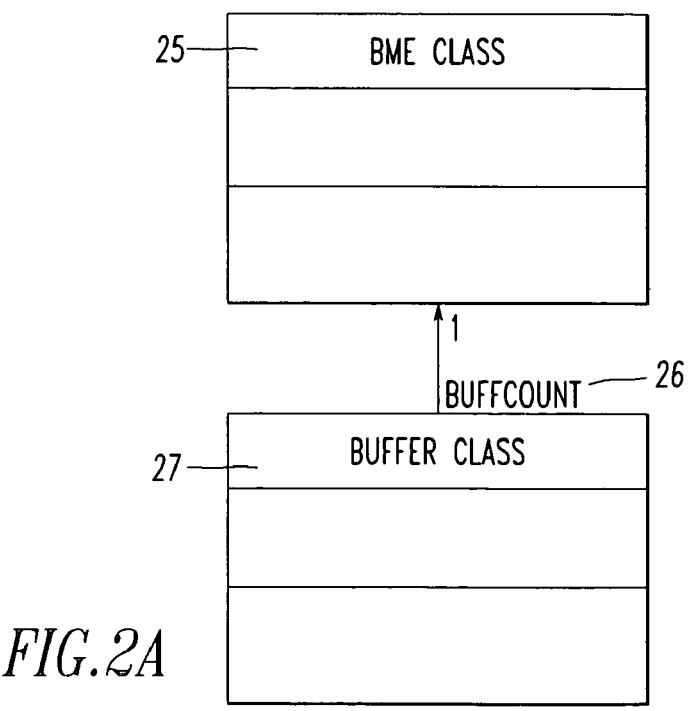
FIG. 2A is an object model diagram of the BME of FIG. 1.

Referring to FIG. 2A, an object model diagram 24 of the buffer management entity 2 of FIG. 1 is shown. This diagram 24 consists of one instance of a buffer manager class (BME CLASS) 25 and multiple (BUFFCOUNT 26) instances of a buffer class (BUFFER CLASS) 27. The buffer manager class 25 controls the assignment of the individual buffers 12 of FIG. 1, while the memory usage is independently controlled by each of those buffers 12. Each of the buffers 12 has sufficient memory to store the largest possible message size handled by the layers 4,6,8,10, which form the associated communication stack of FIG. 1.

The buffer manager class 25 receives buffer requests from the discrete layers 4,6,8 of the communication stack of FIG. 1, searches a list (not shown) of available ones of the buffers 12 for availability, and confirms the acceptance of the buffer request back to the requesting one of the layers 4,6,8. The confirmation indicates the assigned buffer number (e.g., without limitation, #1, #2, #3, #4 of FIG. 1).

The buffer manager class 25 consists of a single state only. All buffer request, buffer release, and confirmation events are handled by actions internal to this state. The state machine 28 of the buffer manager class 25 is shown in FIGS. 2B1-2B2. Upon instantiation of the buffer manager state machine 28, the action in the default transition 30 is executed, which resets all buffers 12 of FIG. 1 to their default (e.g., "free") state, thereby ensuring that all buffers 12 are in a known condition. After the action in the default transition 30 is executed, the BME_Manager state 32 is entered, which state waits for events from the layers 4,6,8 (FIG. 1) of the communication stack. There are three types of events that are handled by the state 32: (1) the BME_RequestBuffer 34; (2) the BME_ReleaseBuffer 36; and (3) the BME_UpdateBuffer 38 events. The state 32 replies to events from any of the layers 4,6,8 (FIG. 1) with a BME_Buffer_Reply event (Table 4), which is directed to the one of the layers 4,6,8 (FIG. 1) that initiated the request.

Referring to FIGS. 1 and 2B1-2B2, the BME_RequestBuffer 34 event has four parameters, which are shown in Table 1. This event is employed for two purposes. One of the layers 4,6,8 may use this event to request a new one of the buffers 12 or to request the current buffer pointer of a buffer that has already been assigned. This action also transfers the right to access an assigned buffer from one of the layers 4,6,8 of the communication stack to the next layer thereof. When the BME_RequestBuffer parameter is issued with the buffNmbr parameter equal to zero, this means that the requesting layer (indicated by the Layer parameter) is requesting a new buffer for storing a new, to be created, message frame. When the buffNmbr parameter is not equal to zero, this means that a buffer has already been assigned and the layer is requesting access to the buffer.

TABLE 1

| Parameter | Range | Description |
| --- | --- | --- |
| Layer | MAC, NWK or APP | Indicates which layer of the communication stack issued the request. |
| RequestedSize | 1 to maxPacketSize | The number of bytes that the layer requests. |
| BufferType | TX, RX or Other | Indicates if the buffer contains a frame to be transmitted, a frame that was received or is used for other purposes |
| buffNmbr | 0 to BUFFCOUNT | Indicates which buffer this request is intended for; 0 means a new buffer is requested. |

The BME_ReleaseBuffer 36 event has two parameters, which are shown in Table 2. This event frees a currently assigned buffer, making it available for other layers to use. Unlike the BME_RequestBuffer 34 and BMEUpdateBuffer 38 events, the BME_ReleaseBuffer 36 request is not confirmed using the BME_Buffer_Reply event (Table 4).

TABLE 2

| Parameter | Range | Description |
| --- | --- | --- |
| Layer | MAC, NWK or APP | Indicates which layer of the communication stack issued the request. |
| buffNmbr | 1 to BUFFCOUNT | Indicates which buffer this request is intended for. |

The BME_UpdateBuffer 38 event has four parameters, which are shown in Table 3. This event applies only to buffers 12 that are receive buffers (i.e., type RX) and is used to indicate how many bytes (e.g., header information) were removed from the message frame in the buffer memory by one of the layer 4,6,8. Alternatively, this event can be used by one of the layers 4,6,8 to change the direction (usage) (e.g., from type RX to type TX; from type TX to type RX) of a buffer.

EXAMPLE 4

The network layer 6 is allowed to change the usage (direction) of a receive (RX type) buffer to a transmit (TX type) buffer. This feature is employed by the network layer 6 to route messages from one node (e.g., 80 of FIG. 3) to another node (not shown) without needing to copy the received message frame from a receive buffer to a transmit buffer. In this example, the BME 2 limits changes in usage (direction) to only this feature.

TABLE 3

| Parameter | Range | Description |
| --- | --- | --- |
| Layer | MAC, NWK or APP | Indicates which layer of the communication stack issued the request. |
| buffNmbr | 1 to BUFFCOUNT | Indicates which buffer this request is intended for. |
| SizeConsumed | 0 to maxPacketSize | The number of bytes that a layer removed from a frame (layer specific header information). |
| NewBuffType | TX or RX | Indicates if a buffer changes its direction (currently only RX to TX is allowed). |

The BME_Buffer_Reply event has three parameters, which are shown in Table 4. This event confirms BME_RequestBuffer 34 and BME_UpdateBuffer 38 events coming from various layers 4,6,8 of the communication stack. The buffNmbr parameter indicates which buffer has been assigned. A buffNmbr parameter of 0 indicates an error and that no buffer has been assigned. The buffLocation parameter contains the pointer to the memory location of the assigned buffer considering the one of the layers 4,6,8 that issued the request and the size of the headers that will be placed in front of the message payload.

TABLE 4

| Parameter | Range | Description |
| --- | --- | --- |
| buffNmbr | 0 to BUFFCOUNT | Indicates the number of the buffer, which has been assigned. |
| buffLocation | Pointer | The pointer to the location in the memory of the buffer where the requesting layer can start writing its payload. |
| SizeAllocated | 0 to macFrameSize | Confirms the number of bytes that the layer requested. |

Figure 2C:
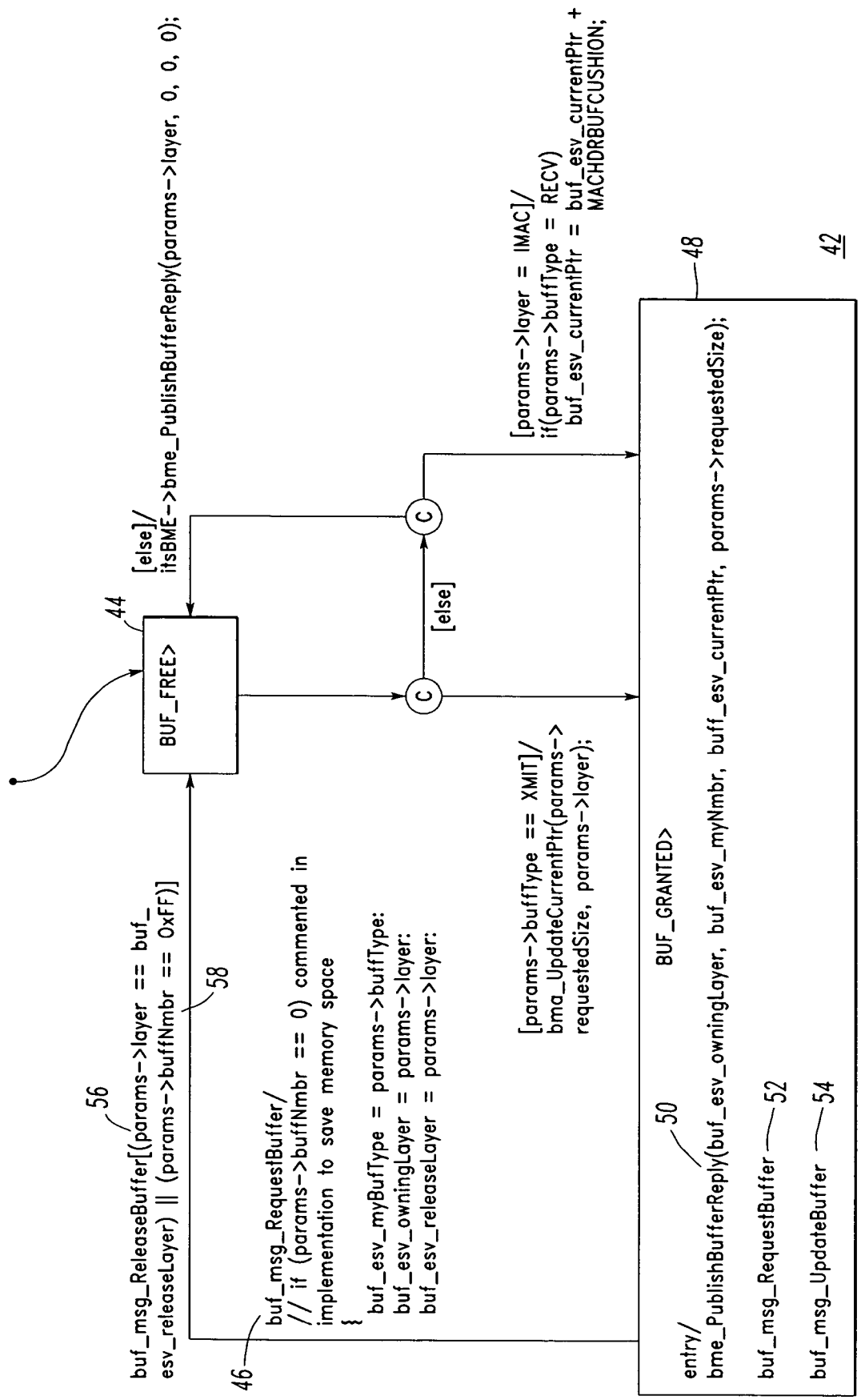
FIG. 2C is a state diagram of the buffer class of FIG. 2A.

The BME 2 (FIG. 1) has multiple instances of the buffer class 27 (FIG. 2A). The number of buffers (BUFFCOUNT 26) that an instantiation of the BME 2 may contain is implementation specific and depends on the amount of available memory and the traffic the layers 4,6,8,10 of a particular communication stack may need to handle. Each of the buffers 12 has two states indicating its usage: (1) free/available; or (2) granted/assigned. The state diagram 42 of the buffer class 27 is shown in FIG. 2C. Each instance of the buffer class 27 only receives events that have been forwarded by the buffer manager class 25 (FIG. 2A); in turn each one of the buffers 12 will only send events to the buffer manager class 25. The events that each instance of the buffer class 27 issues and receives are identical to the events of the buffer manager class 25 since that class simply forwards them.

Referring to FIGS. 1 and 2C, when one of the buffers 12 is in the BUF_FREE state 44, it only accepts the buf_msg_RequestBuffer 46 (the BME internal translation of BME_RequestBuffer 34) event, all other events will be ignored. On receipt of a buf_msg_RequestBuffer 46 event, the state machine 42 transitions from the BUF_FREE state 44 and saves the buffer type parameter and the requesting layer parameter to local variables. Any one of the layers 4,6,8 of the communication stack may request a transmit buffer. If a transmit buffer is requested, then the pointer to the location of the memory is calculated based on which layer requested the buffer and the predefined maximum header overhead for each layer of the communication stack. This is important since each layer will put its header in front of the payload received from the higher layers. After the calculation has been executed, the buffer's state machine 42 transitions into the BUF_GRANTED state 48.

EXAMPLE 5

Only the MAC layer 8 may request one of the buffers 12 of type OTHER or type RX (receive). If the other layers 4,6 make a request for a type OTHER or type RX buffer, then the request will be denied and the state machine 42 will go back to the BUF_FREE state 44. When the MAC layer 8 requests a type RX buffer, the pointer to the memory location is calculated; otherwise, the pointer is assumed to be the beginning of the local buffer's memory. For example, this is done to accommodate potentially larger size headers in case the received message has to be rerouted to another node. On completion, the state machine 42 will transition into the BUF_ GRANTED state 48.

On entry into the BUF_GRANTED state 48, the state machine 42 issues the confirmation event called bme_PublishBufferReply 50, which is translated into the BME_Buffer_Reply event (Table 4) by the buffer manager class 25 (FIG. 2A). When in the BUF_GRANTED state 48, the state machine 42 accepts the buf_msg_RequestBuffer 52, buf_msg_UpdateBuffer 54, and the buf_msg_ReleaseBuffer 56 events. This was discussed, above, in connection with the BME_RequestBuffer 34 and BME_UpdateBuffer 38 events for the state machine 28 (FIGS. 2B1-2B2).

When the buffer is in the BUF_GRANTED state 48 and receives a buf_msg_ReleaseBuffer 56 event, the state machine 42 checks if the communication layer issuing the request currently owns the buffer; otherwise, the request will be ignored. This may be overwritten by setting the buffNmbr parameter 58 to 0xFFH, which is typically used by the application layer 4 to free all buffers 12 after the communication stack has been reset. After the buffer has been released, the buffer's state machine 42 will return to the BUF_FREE state 44 and all local variables will be reset to their default values.

EXAMPLE 6

Table 5, below, shows the responsibility of the communication layers 4,6,8,10 with respect to the buffer management functions.

TABLE 5

| Tasks | PHY 10 | MAC 8 | NWK 6 | APP 4 |
| --- | --- | --- | --- | --- |
| TX Buffer Request | No | Yes | Yes | Yes |
| RX Buffer Request | No | Yes | No | No |
| TX Buffer Release | No | Yes | Yes | Yes |
| RX Buffer Release | No | Yes | Yes | Yes |
| TX Length Update | No | Yes | Yes | Yes |
| RX Length Update | No | Yes | Yes | Yes |
| Other Buffer Request | No | Yes | No | No |
| Other Buffer Release | No | No | Yes | No |

MAC layer 8 TX and RX Buffer Release are employed for MAC command, discovery (e.g., beacon) and acknowledgement frames. The network layer 6 TX and RX Buffer Release are employed for NWK command frames. The application layer 4 TX and RX Buffer Release are employed for data frames. Other Buffer Request and Other Buffer Release header and footer rules do not apply to "Other" buffers.

Table 6 shows various BME Primitives.

TABLE 6

| Primitive Name | Event Parameters | Parameter Descriptions |
|---|---|---|
| BME_ReleaseBuffer | LR_Layers layer | Stack layer which is releasing the buffer |
| | U8 buffNmbr | The number of the buffer which is being released |
| BME_RequestBuffer | LR_Layers layer | Stack layer which is requesting the buffer |
| | U8 requestedSize | The requested size of the requested buffer |
| | BufferType buffType | The type of buffer being requested |
| | U8 buffNmbr | The number of the buffer being requested (0 for new) |
| BME_UpdateBuffer | LR_Layers layer | Stack layer which is updating the buffer data |
| | U8 buffNmbr | The number of the buffer being updated |
| | U8 sizeConsumed | The size consumed by the buffer (previous to update); this is used to update the buffer pointer in the BME |
| | BufferType newBuffType | The type to which the buffer is being changed | wherein:

BME_ReleaseBuffer 36 is a request by one of the communication layers 4,6,8 for the BME 2 to release a specific one of the buffers 12 from usage, thereby allowing the BME 2 to free the buffer memory.

BME_RequestBuffer 34 is a request by one of the communication layers 4,6,8 for the BME 2 to request one of the buffers 12, where buffNmbr is 0 for a new request, and, otherwise, buffNmbr is the buffer pointer requested. The layer requesting the buffer is set to the owner.

BME_UpdateBuffer 38 is an update for the type of the specific one of the buffers 12 for a specific buffer number or when the pointer for a particular buffer needs to be updated (e.g., due to the layers 4,6,8 removing headers on a reception).

LR_Layers is an enumerated type that indicates the specific one of the layers 4,6,8 requesting the services (e.g., without limitation, APP=1; NWK=2; MAC=3; PHY=4; any suitable identifier to distinguish between communication layers).

U8 is an unsigned byte, which ranges from 0 to 255.

BufferType is an enumerated type that indicates the current usage of the buffers 12 (e.g., TX; RX; Other). The newBuffType tells the BME 2 how this buffer is going to be used, in order that the pointer operations can be done correctly.

There are three valid instructions the layers 4,6,8 can tell the BME 2: (1) to release; (2) to request; and (3) to update (take ownership of) one of the buffers 12. Since these primitives are accessible to all the layers 4,6,8, each one of those layers needs to identify itself, in order that the BME 2 can do the appropriate pointer operations for the requesting layer. That information is provided in the "layer" event parameter.

The particular one of the buffers 12 to be accessed is passed in the buffNmbr parameter. With this implementation, up to, for example, 254 buffers can be used. A buffNmbr parameter of zero means that the particular one of the layers 4,6,8 needs a new buffer.

The parameter sizeConsumed tells the BME 2 how many bytes were used by the particular one of the layers 4,6,8, in order that the BME 2 can rearrange the internal pointers in case the next layer requests it the next time.

The BME 2 manages the message frame buffers 12 that are used by all communication layers 4,6,8,10, which use, produce or consume message frames. The BME 2 preferably: (1) provides buffers 12 that are shared among all layers 4,6,8,10; (2) manages buffer requests on a first-come first-served basis (3) provides a count of buffers 12 for N messages (e.g., N is a suitable message count of four; greater than four; 15; any suitable count of buffers based upon available memory); (4) each of the buffers 12 can hold M bytes (e.g., M is a suitable buffer size, which is protocol specific and dependant upon the lowest layer protocol, i.e., the physical layer 10); and (5) provides the buffers 12 that can be implemented with one of various different data structures, such as a simple array, a linear queue or a circular queue. Each of the buffers 12 employs sufficient memory to store the largest possible data frame, although some or most of the message frames may be significantly smaller.

The BME 2 preferably employs the following rules while managing its buffers 12: (1) when granting a request for a transmit buffer, the BME 2 ensures that at least one of the buffers 12 for receiving the corresponding acknowledgement is available; (2) when granting a request for a receive buffer, the BME 2 ensures that at least one of the buffers 12 for a future transmit request is available; (3) for the "Other Buffers" and "Transmit Buffers", the BME 2 is aware of the type of message that is being sent, in order to return the correct pointer in the corresponding one of the buffers 12, thereby allowing sufficient space for the lower layer headers in front of the payload.

Table 7, below, shows messages for data transmission between the layers 4,6,8,10. These messages have no direct relation with the BME 2. In the BME 2, the layers 4,6,8,10 exchange a buffer number (a token), in order that the next layer can retrieve the particular one of the buffers 12. All these primitives are of type DATA. What the particular one of the layers 4,6,8,10 tells its peer layer is just the buffer number (handle) to be transferred and the number of bytes used in that particular one of the buffers 12. Then, the next layer requests ownership of that buffer and processes it.

TABLE 7

| Primitive | Destination |
|---|---|
| NK_DATA.request | NWK layer 6 |
| NK_DATA.confirm | APP layer 4 |
| NK_DATA.indication | APP layer 4 |
| MCPS_DATA.request | MAC layer 8 |
| MCPS_DATA.confirm | NWK layer 6 |
| MCPS_DATA.indication | NWK layer 6 |
| PD_DATA.request | PHY layer 10 |
| PD_DATA.confirm | MAC layer 8 |
| PD_DATA.indication | MAC layer 8 |
| PD_DATA.indication | PHY layer 10 |

EXAMPLE 7

Figure 3:
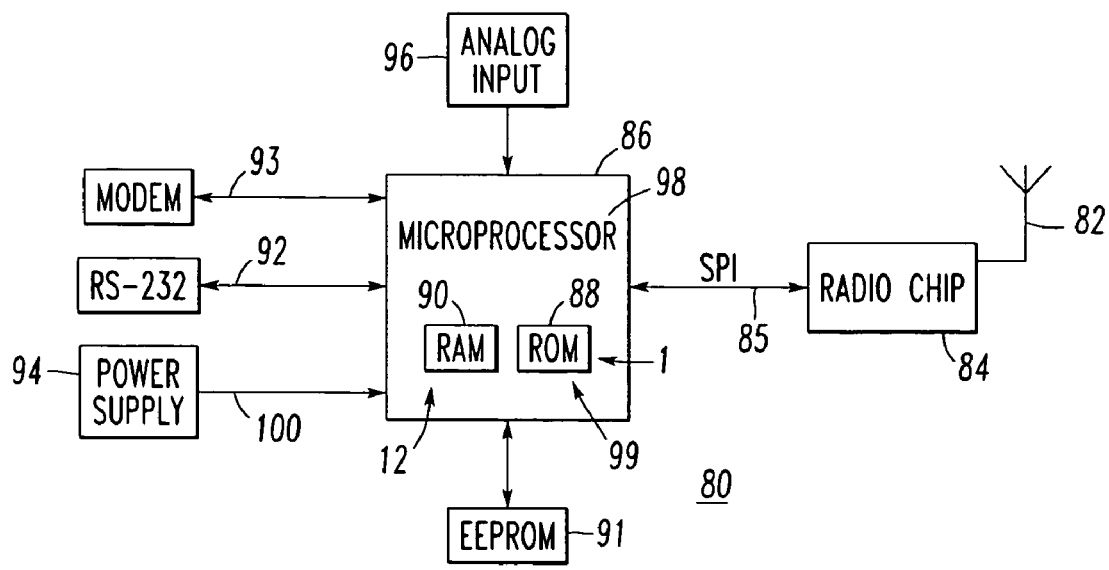
FIG. 3 is a block diagram of a network device including the BME of FIG. 1.

FIG. 3 is a block diagram of a node, such as LR-WPAN node 80, including an antenna port 82, a wireless (e.g., radio frequency (RF)) front-end transceiver 84, a serial peripheral interface (SPI) 85, a processor, such as a micro-controller core 86, having ROM 88 and RAM 90, an external EEPROM 91, a programming port 92 (e.g., RS-232), a modem port 93, a power supply 94 and a suitable sensor interface, such as an analog input 96. An 8-bit microprocessor 98 of the core 86 executes code including the QF 1 and a communication routine 99 having the protocol stack 21 of FIG. 1. In this example, the buffers 12 of FIG. 1 are internal to the microprocessor 98, although they may be part of any suitable processor's internal or external memory. The buffers 12 are preferably part of a single array. Alternatively, a linear queue, a circular queue or other suitable storage mechanism may be employed. The PHY layer 10 of the protocol stack 21 of FIG. 1 is associated with the transceiver 84 through the SPI 85.

The communication routine 99 subscribes to a plurality of events by the BME 2 and the independent communication layers 4,6,8,10 through the QF 1 of FIG. 1 and publishes a plurality of corresponding events by the BME 2 and by the independent communication layers 4,6,8,10 through the QF 1.

EXAMPLE 8

Figure 7:
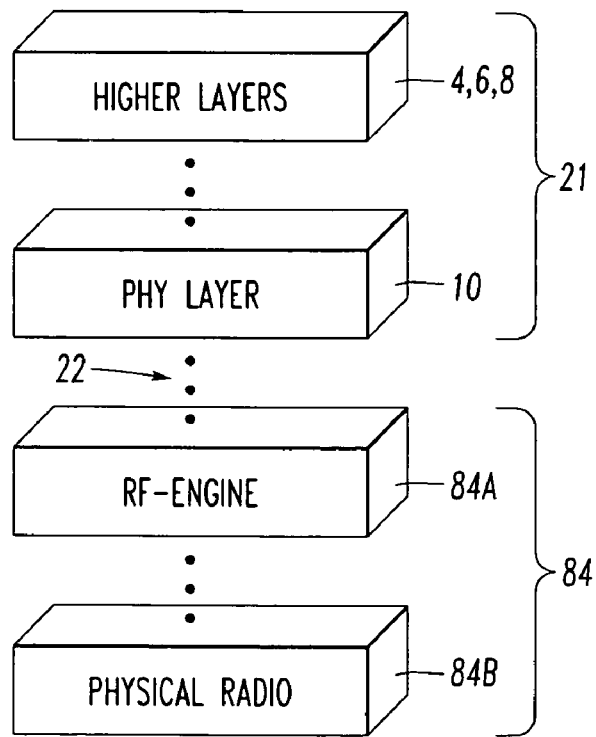
FIG. 7 is a block diagram of a portion of the LR-WPAN communication stack and the interface to the radio chip of FIG. 3, which includes the physical radio and the corresponding driver or RF-Engine.

The communication routine 99 may further include the RF HW abstraction 22 of FIG. 1. In this example, the PHY layer 10 communicates directly with the RF HW abstraction 22, which communicates with an RF-Engine 84A of the transceiver 84 as is shown in FIG. 7.

EXAMPLE 9

As an alternative to Example 8, the PHY layer 10 may include a suitable wireless transceiver interface, such as the RF HW abstraction 22.

EXAMPLE 10

The core 86 may be, for example, a model mega 128 marketed by Atmel Corporation of San Jose, Calif.

EXAMPLE 11

The transceiver 84 may be, for example, a CC1010 or CC2420 RF Transceiver marketed by Chipcon AS of Oslo, Norway. The transceiver 84 incorporates a suitable microcontroller core, such as 86, a relatively very low-power RF transceiver, and hardware DES encryption/decryption (not shown).

EXAMPLE 12

The sensor interface may include, for example, more or more analog-to-digital inputs, one or more digital-to-analog outputs, one or more UART ports, one or more SPIs and/or one or more digital I/O lines (not shown).

The voltage 100 of the power supply 94 may be, for example, about 3.0 to about 3.3 VDC, although any suitable voltage may be employed (e.g., 5 VDC, 1 VDC).

The micro-controller core 86 may have, for example, ROM code space of about 32 Kbytes and RAM space of about 2 Kbytes.

EXAMPLE 13

Figure 4A:
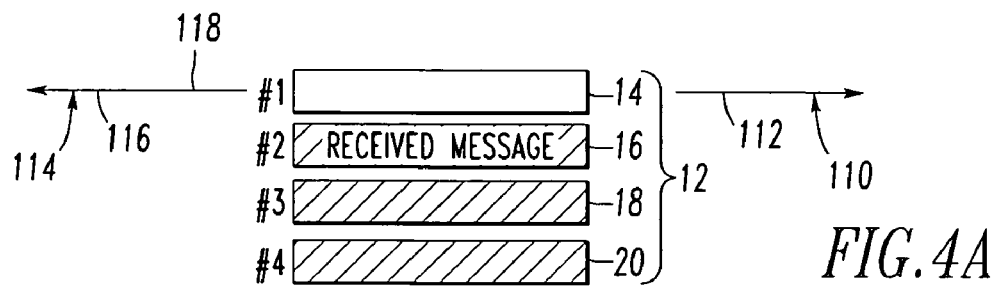
FIGS. 4A-4P are message diagrams for assembling frames and transmitting application data by the BME and communication layers of FIG. 1.
Figure 4B:
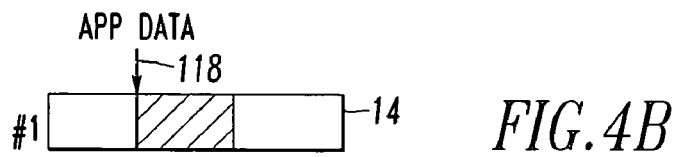
Figure 4C:
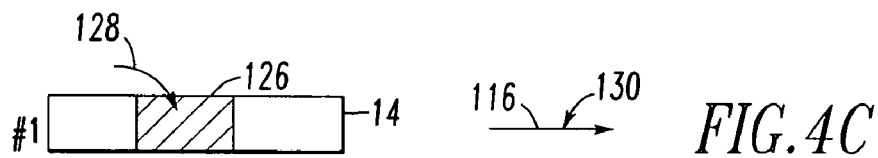
Figure 4D:
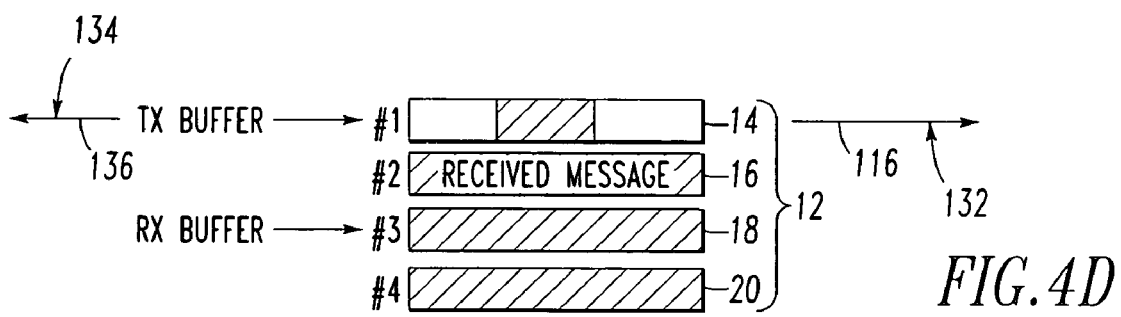
Figure 4E:
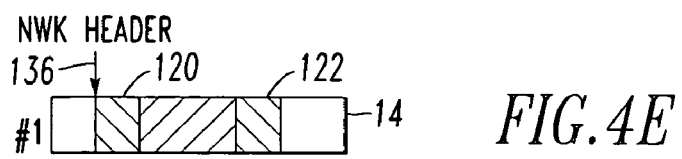
Figure 4F:
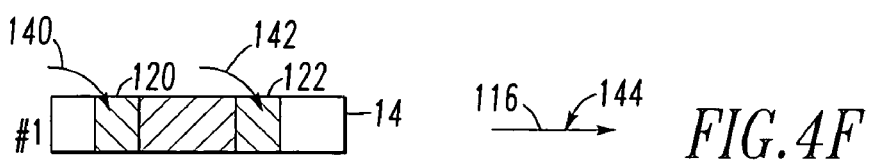
Figure 4G:
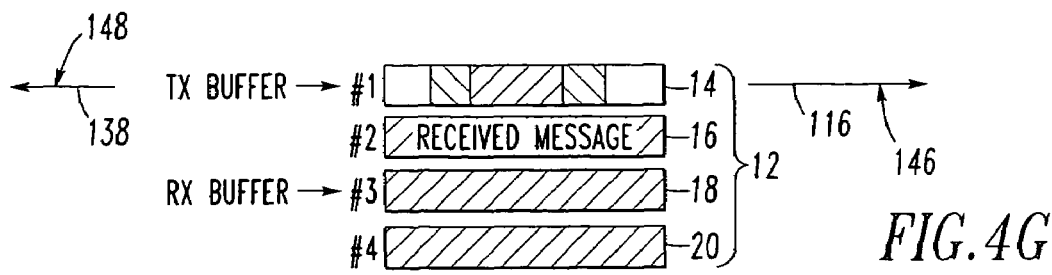
Figure 4H:
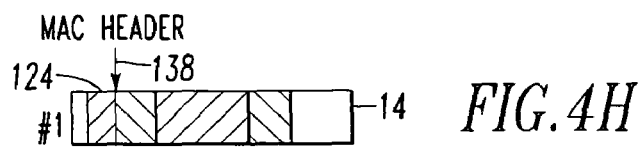
Figure 4I:
Figure 4J:
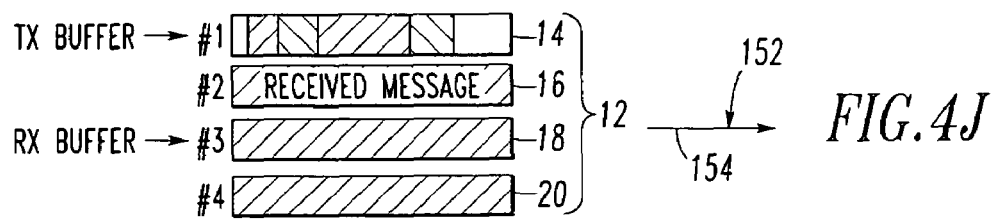
Figure 4K:
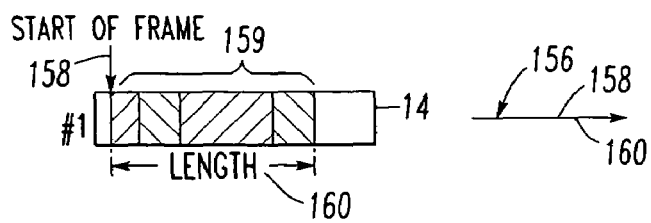
Figure 4L:
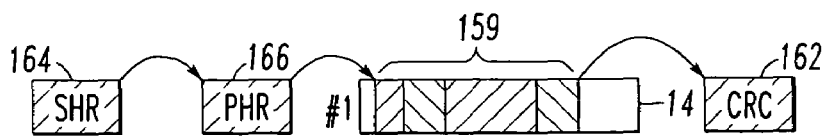
Figure 4M:
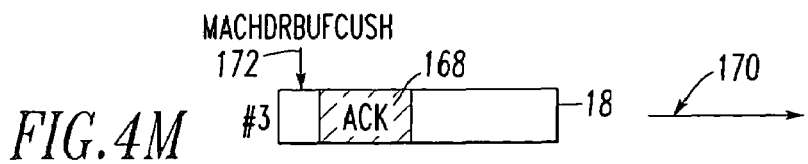
Figure 4N:
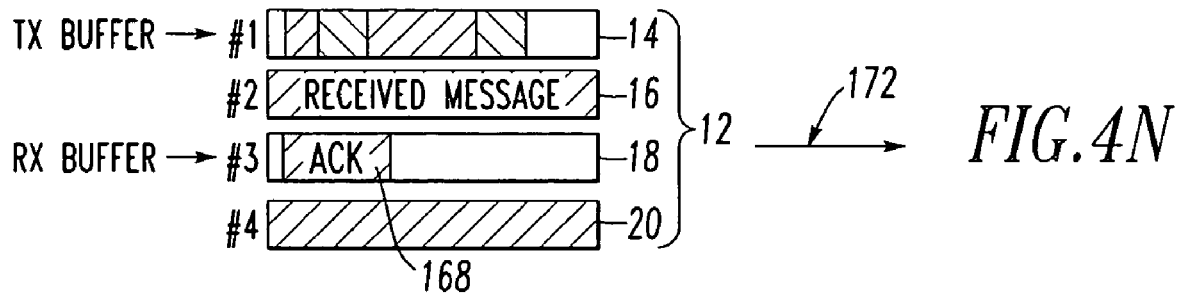
Figure 4O:
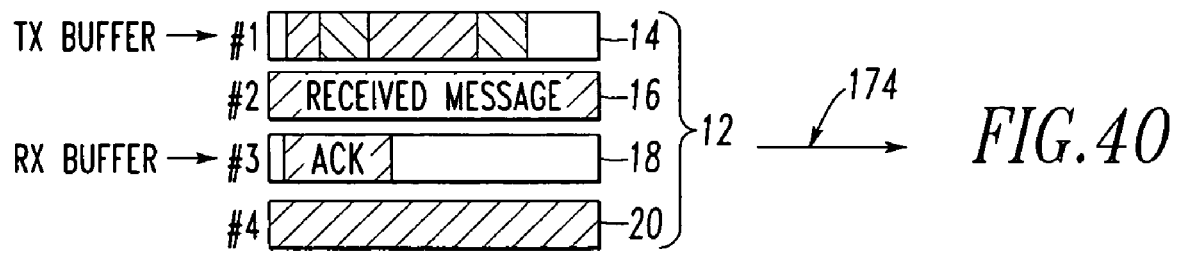
Figure 4P:
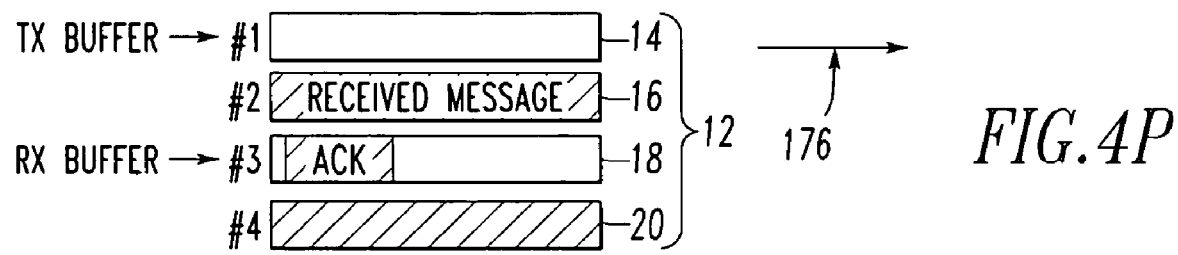

Referring to FIGS. 1 and 4A-4P, an example of how the BME 2 transmits application data including the interaction of the layers 4,6,8 with the BME 2, in order to assemble a message frame, such as 159, is shown.

First (FIG. 4A), the application layer 4 requests a new transmit buffer (e.g., buffer 14) from the BME 2 by sending a BME_RequestBuffer (Buffer Request) message 110 to the BME 2 and specifying the number of bytes 112 it wants to send. Here, also, the receive buffer 16 was reserved and the other buffers 18,20 are free/available. Next, the BME 2 checks if a buffer (e.g., buffer 14) is available and may, also, check to see if there is at least one receive buffer (e.g., buffer 16) available. The BME 2 grants the request and, then, returns (BME_Buffer_Reply event (Table 4), at 114, the buffer number 116 (e.g., #1) and a pointer 118 (as best shown in FIG. 4B) to the part of the buffer 14 where the application layer 4 can write its data. This publishes by one of the independent communications layers, such as 4, a request to the BME 2 through the QF 1, and publishes by the BME 2 a response to that layer through the QF 1. A similar mechanism may be employed to later release that buffer. In either event, asynchronous communications are employed over the corresponding interfaces 1A, 1B, 1C, 1D, 1E. Also, the BME 2 subscribes to requests from the independent communications layers 4,6,8 through the QF 1. Further, the independent communication layers 4,6,8 subscribe to responses from the BME 2 through the QF 1. For example, the BME 2 subscribes to a request from one of the independent communications layers 4,6,8 through the QF 1. That layer publishes the request through the QF 1 to the BME 2. That layer also subscribes to a response from the BME 2 through the QF 1. Finally, the BME 2 publishes the response through the QF 1 to the requesting one of the independent communications layers 4,6,8.

The BME 2 also ensures that sufficient space is available for the NWK header 120 (FIG. 4E), NWK footer 122 (FIG. 4E) and MAC header 124 (FIG. 4H). Finally, the BME 2 sets the application layer 4 as both the owner and releaser (as the release layer) of the buffer 14.

Then (FIG. 4C), the application layer 4 fills the assigned buffer space 126 with its data 128 and issues a NK_DATA.request primitive 130 to the network layer 6 indicating the buffer number 116 (FIG. 4A) and handing off the control of the buffer 14 to the network layer. This publishes by one of the independent communications layers, such as 4, an indication to another one of the independent communication layers, such as 6, through the QF 1. For example, this includes subscribing by one of the independent communications layers 4,6,8 to an indication from another one of the independent communication layers 4,6,8 through the QF 1, and publishing the indication from another one of the independent communications layers 4,6,8 through the QF 1 to the corresponding one of the independent communication layers 4,6,8.

The network layer 6 requests (FIG. 4D) to add its header 120 (FIG. 4E) and footer 122 (FIG. 4E) to the message in the buffer 14 by sending a Buffer Request message 132 to the BME 2. The size of the NWK header 120 is not specified because it is fixed. The request message 132 contains the buffer number 116 received from the NK_DATA.request primitive 130 (FIG. 4C). Then, the BME 2 returns, at return event 134, a pointer 136 (as best shown in FIG. 4E) to the location where the network layer 6 can add its header 120 (and after a suitable length calculation by the network layer 6, its footer 122). The BME 2 also sets the network layer 6 as the current owner of the buffer 14. Since the size of the header 120 is either fixed or transmitted in the Buffer Request message 132 (FIG. 4D), the BME 2 returns the correct pointer location.

For data transmission, the BME 2 returns the pointer 136 to the network layer 6 and a pointer 138 (FIG. 4H) to the MAC layer 8, because the network layer 6 does not know or care where the application data 128 (FIG. 4C) went and, instead, only cares where its NWK header 120 will go (after giving the size to the BME 2).

Next (FIG. 4F), the network layer 6 fills the assigned buffer space 120 and 122 with its header information 140 and footer information 142, respectively, thereby ensuring that the application data 128 (i.e., APP payload) (FIG. 4C) is not destroyed. The network layer 6 ensures that the APP payload is not destroyed by not writing more than the length of its header 120. After the NWK header 120 and NWK footer 122 are written to the buffer 14, the network layer 6 issues a MCPS_DATA.request primitive 144 to the MAC layer 8 indicating the buffer number 116 and handing off the control of the buffer 14 to the MAC layer 8.

Then (FIG. 4G), the MAC layer 8 requests to add its header 124 (FIG. 4H) to the message in the buffer 14 by sending a Buffer Request message 146 to the BME 2. The request message 146 contains the buffer number 116 received from the MCPS_DATA.request primitive 144 (FIG. 4F).

The BME 2 returns, at return event 148, the pointer 138 to the location where the MAC layer 8 can add its header 124 (FIG. 4H). Here, as shown in FIG. 4H, the pointer 138 is an "end pointer" to the header 124 because the MAC layer 8 writes the header 124 in reverse order or backwards. The BME 2 also sets the MAC layer 8 as the owner of the buffer 14.

Next (FIG. 4I), the MAC layer 8 fills the assigned buffer space 124 with its header information 150 ensuring that the network header 120 is not destroyed.

Then (FIG. 4J), the MAC layer 8 retrieves a receive buffer, such as buffer 18, from the BME 2 by sending a Buffer Request 152 with Buffer Number 154 of 0, in order to request a new buffer, from the BME 2.

Then (FIG. 4K), the MAC layer 8 sends a PD_DATA.request primitive 156 to the physical layer 10 with a pointer 158 to the beginning of the frame 159 to be transmitted and its length 160, which hands off the control of the buffer 14 to the physical layer 10.

Next (FIG. 4L), the physical layer 10 generates the CRC 162 of the frame 159. The physical layer 10 also transmits the synchronization header (SHR) 164, the PHY header (PHR) 166, the frame 159 and the CRC 162.

Then (FIG. 4M), the physical layer 10 receives an incoming packet 168 and writes it into the current receive buffer 18. The synchronization and PHY headers 164,166 are not saved in the buffer 18. After checking the CRC 162, the physical layer 10 sends a PD_DATA.indication primitive 170 to the MAC layer 8.

EXAMPLE 14

FIG. 4M shows a MACHDRBUFCUSH (MAC Header buffer cushion) 172. The BME 2 may be employed for a PSR algorithm implementation (e.g., as disclosed in U.S. patent application Ser. No.10/441,315). Each node, such as 80 of FIG. 3, can receive packets from other nodes (not shown) and, then, retransmit them by adding its own address (e.g., increment/decrement routing). With the BME 2, there is no need to rebuild the packet, in order to retransmit it, thereby saving time and effort. However, sometimes, it is needed to send some information at the "left" side (e.g., with respect to FIG. 4M) of the packet to be re-transmitted. Hence, the "cushion" 172 is reserved at the MAC level, in order that there is sufficient room for those extra bytes for re-transmission.

Next, the MAC layer 8 receives the PD_DATA.indication primitive 170 (FIG. 4M) from the physical layer 10. Then, the MAC layer 8 evaluates the received message 168 and determines that it is the acknowledgement (ACK) of the previous transmission. Since the transmission was successful, the MAC layer 8 issues a MCPS_DATA.confirm primitive 172 to the network layer 6 as shown in FIG. 4N.

Next (FIG. 4O), the network layer 6 issues a NK_DATA.confirm primitive 174 to the application layer 4.

Finally, upon receipt of the confirm primitive 174, the application layer 4 assumes the requested data transmission was successful and releases, at BME_ReleaseBuffer event 176, the transmit buffer 14 back to the BME 2 as shown in FIG. 4P. That buffer 14 is now available for the various layers 4,6,8 to use.

EXAMPLE 15

Referring to FIGS. 1 and 5A-5M, an example of data reception when an application data packet 179 (FIG. 5A) is received is shown. The following describes the interaction of the layers 4,6,8 with the BME 2, in order to extract the received message 180. Before a data packet can be received, the MAC layer 8 requests with Buffer Request message 182 a receive buffer (e.g., buffer 14) from the BME 2 and initializes the physical layer 10. When the MAC layer 8 is initialized, it sends an initialization message 184 to the physical layer 10. Then, the physical layer 10 receives the incoming data packet 179 and writes it into the current receive buffer 14. The synchronization header (SHR) 185 and PHY header (PHR) 186 are not saved in the buffer 14. After the CRC 188 has been checked, the physical layer 10 issues a PD_DATA.indication primitive 190 to the MAC layer 8 indicating the buffer 14.

Next, the MAC layer 8 analyzes the received message 180 in the buffer 14, creates an acknowledgement frame 192 (FIG. 5B), and issues a PD_DATA.request primitive 194 to the physical layer 10 causing the frame 192 to be sent to the sender (not shown) of the data packet 179.

Then, the MAC layer 8 requests with Buffer Request message 196 (FIG. 5C) a new receive buffer (e.g., buffer 16) from the BME 2, in order that this buffer is ready to receive a new data packet, since the last buffer 14 is occupied with fresh data of the message 180.

Then (FIG. 5D), the BME 2 checks if one of the buffers 12 is available and may, also, check to confirm if there is at least one transmit buffer (e.g., buffer 18) available. When the BME 2 grants, at return event 198, the Buffer Request message 196, it returns the buffer number 200 (e.g., #2) and sets the MAC layer 8 as the owner and origin of that buffer.

Next (FIG. 5E), the MAC layer 8 requests the new receive buffer 16 upon receipt of the PD_DATA.confirm primitive 202 (FIG. 5D) from the physical layer 10 confirming that the ACK packet 192 has been sent.

Then (FIG. 5F), the MAC layer 8 extracts, at 204, the MAC header 206 from the received message 180 and updates the BME 2 on the number of bytes it removed by sending a Buffer Update message 208. Next, the MAC layer 8 issues a MCPS_DATA.indication primitive 210 to the network layer 6, indicating the buffer number 212 (e.g., #1), and handing off control of the buffer 14 to the network layer 6.

Figure 5A:
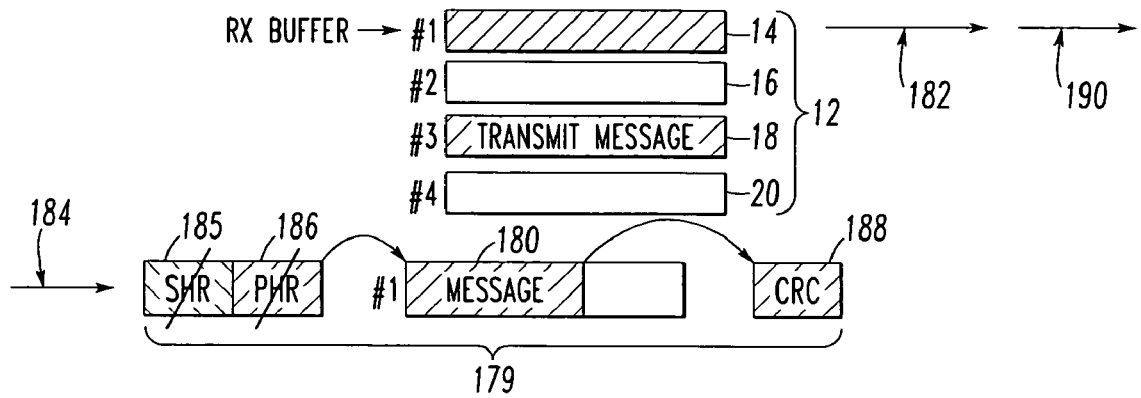
FIGS. 5A-5M are message diagrams for receiving application data and disassembling frames by the BME and communication layers of FIG. 1.
Figure 5B:
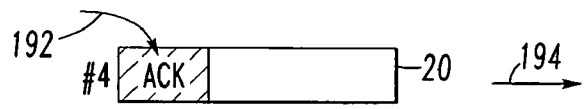
Figure 5C:
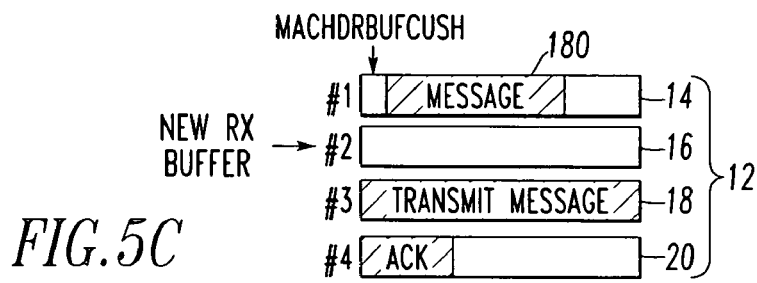
Figure 5D:
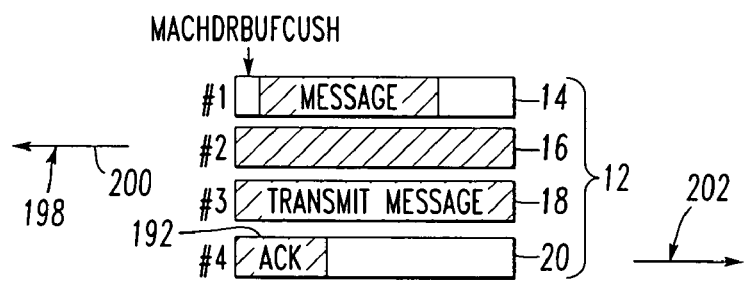
Figure 5E:
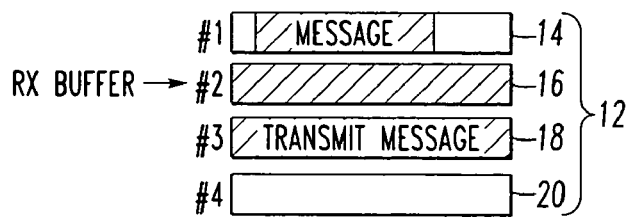
Figure 5F:
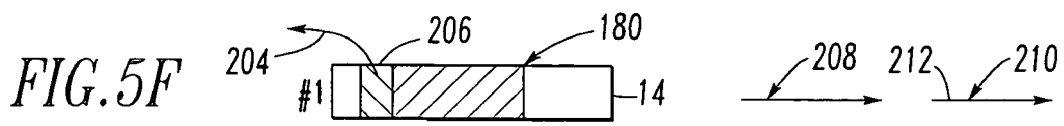
Figure 5G:
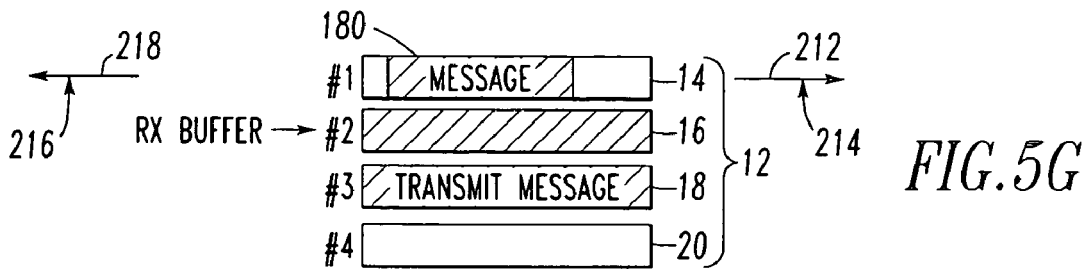
Figure 5H:
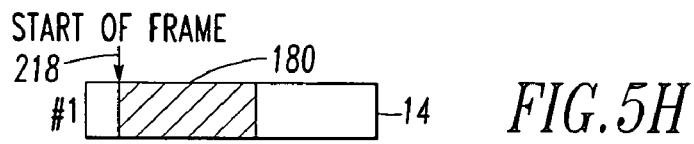
Figure 5I:
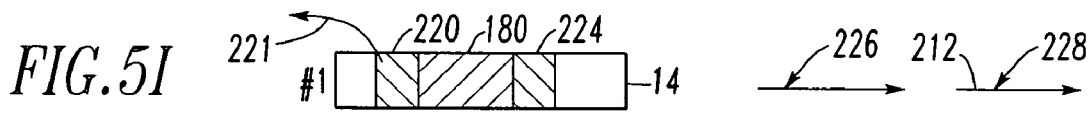

As shown in FIG. 5G, upon receipt of the MCPS_DATA.indication primitive 210, the network layer 6 requests the current starting pointer for the received message 180 from the BME 2 by sending a Buffer Request message 214 containing the buffer number 212 from the MCPS_DATA.indication primitive 210. Then, the BME 2 returns, at return event 216, the pointer 218 (as best shown in FIG. 5H) indicating the start of the NWK header 220 (as best shown in FIG. 5I) of the received message 180.

Next (FIG. 5I), the network layer 6 extracts, at 221, the NWK header 220 and NWK footer 224 from the received message 180 and updates the BME 2 on the number of bytes it removed by sending a Buffer Update 226. Then, the network layer 6 issues a NK_DATA.indication primitive 228 to the application layer 4, indicating the buffer number 212.

Then (FIG. 5J), upon receipt of the NK_DATA.indication primitive 228, the application layer 4 requests with BME_RequestBuffer event 230 the current starting pointer for the received message 180 (FIG. 5I) from the BME 2. The BME 2 returns, at return event 232, the pointer 234 (as best shown in FIG. 5K) indicating the start of the APP data 236 of the received message 180 (FIG. 5J).

Figure 5J:
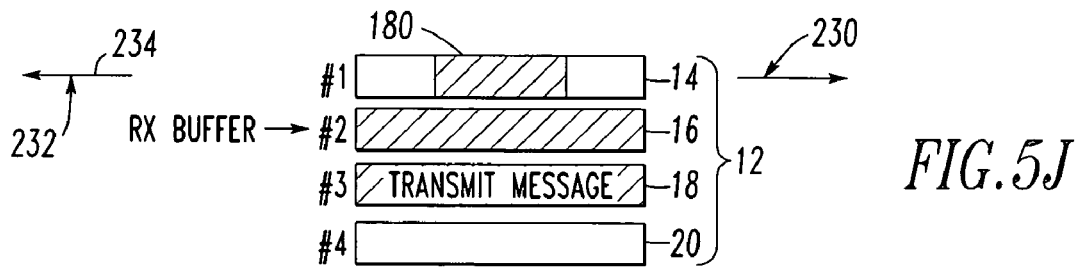
Figure 5K:
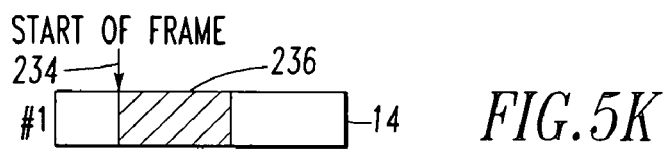
Figure 5L:
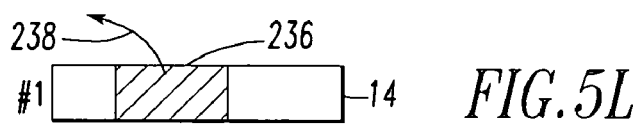
Figure 5M:
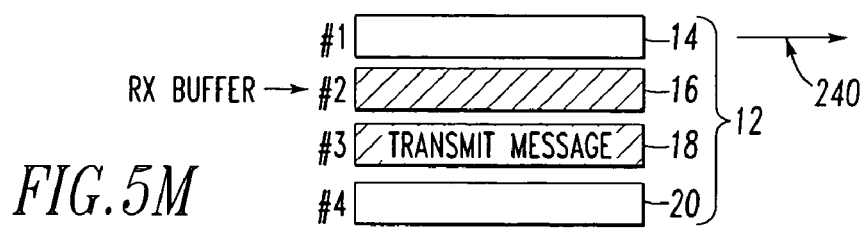

Next (FIG. 5L), the application layer 4 extracts, at 238, the APP data 236 from the received message 180 (FIG. 5J).

Finally (FIG. 5M), since all data has been extracted, the receive buffer 14 is now released, at BME_ReleaseBuffer event 240, back to the BME 2 and the buffer 14 is available for any of the layers 4,6,8 to use.

EXAMPLE 16

Referring to FIGS. 1 and 6A-6I, an Other Data Request Scenario (e.g., to store a PAN descriptor list while doing an active scan) is shown.

First (FIG. 6A), before a data packet can be received, the MAC layer 8 requests with Buffer Request message 250 a receive buffer (e.g., buffer 14) from the BME 2 and initializes, at message 252, the physical layer 10, in order that data packets can be received.

Next (FIG. 6B), the physical layer 10 receives an incoming data packet 254 and writes it into the current receive buffer 14. The synchronization header (SHR) 256 and PHY header (PHR) 258 are not saved in the buffer 14. After the CRC 260 has been checked, the physical layer 10 issues a PD_DATA.indication primitive 262 to the MAC layer 8 indicating the buffer 14.

Figure 6A:
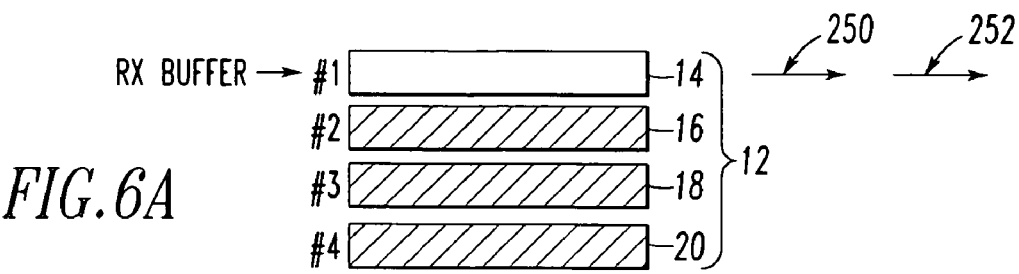
FIGS. 6A-6I are message diagrams for other data requests by the BME and the MAC and network communication layers of FIG. 1.
Figure 6B:
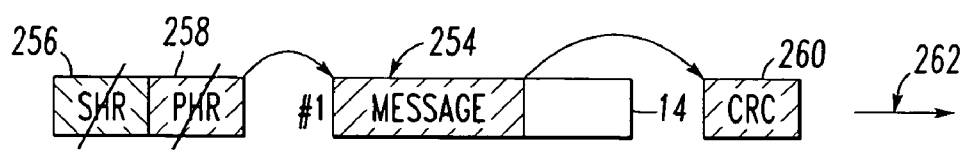
Figure 6C:
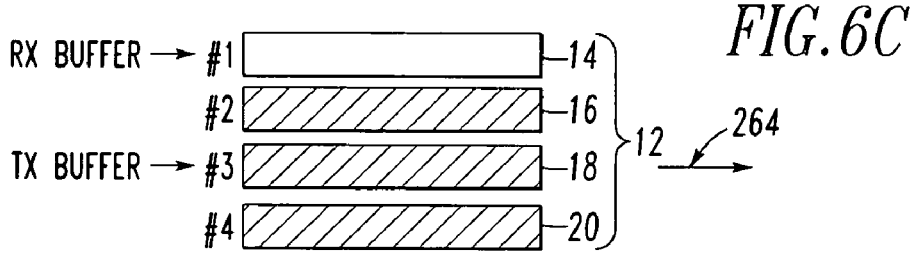
Figure 6D:
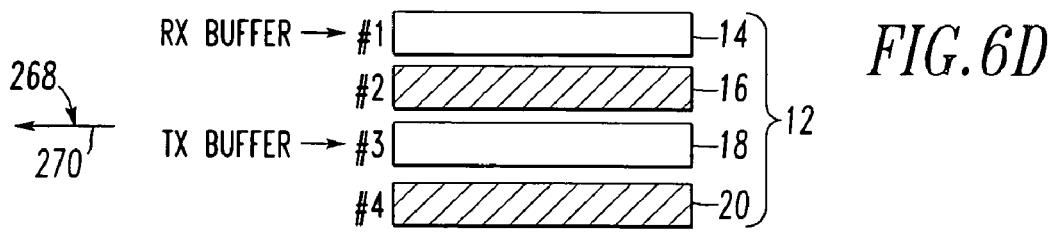
Figure 6E:
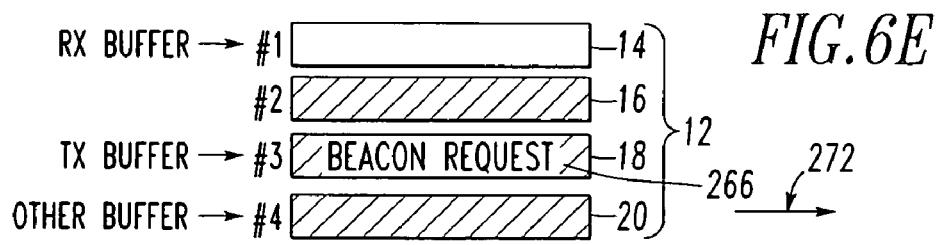
Figure 6F:
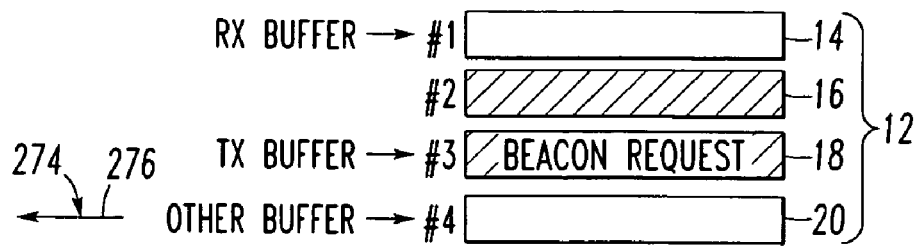
Figure 6G:
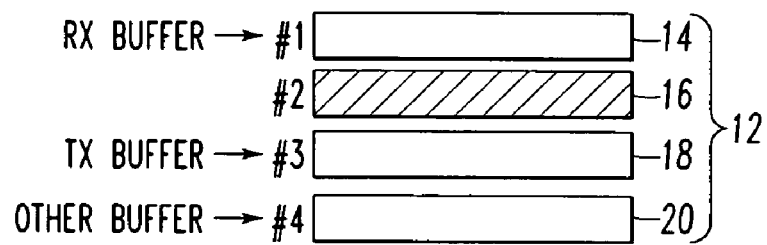
Figure 6H:
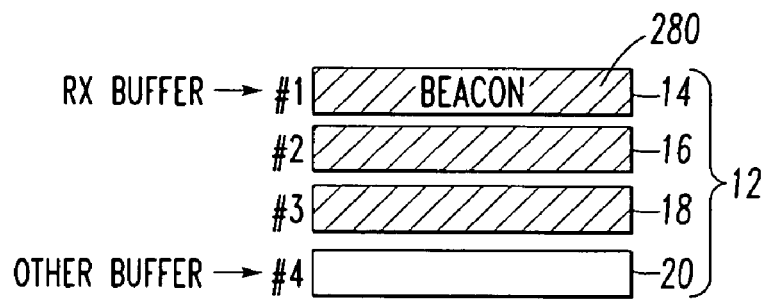

Then (FIG. 6C), the MAC layer 8 requests with Buffer Request message 264 a new "TX" buffer from the BME 2, in order to send a (neighbor) discovery request, such as a MAC Beacon request 266 (FIG. 6E). The MAC Beacon Request 266 is an aggregation of several packets (beacons) that the MAC layer 8 has to store somewhere for concatenation. After all the beacons are finished, the MAC layer 8 can send this buffer to the network layer 6. Hence, the buffers 12 of the BME 2 can be employed for temporal storage of data. Normally, however, each of the buffers 12 is employed for one incoming or outgoing data packet or message.

Next (FIG. 6D), the BME 2 checks if a buffer (e.g., buffer 20) is available and if there is at least one transmit buffer (e.g., buffer 18). When the BME 2 grants, at return event 268, the Buffer Request message 264 (FIG. 6C), it returns the buffer number 270 (e.g., #3).

Figure 6I:
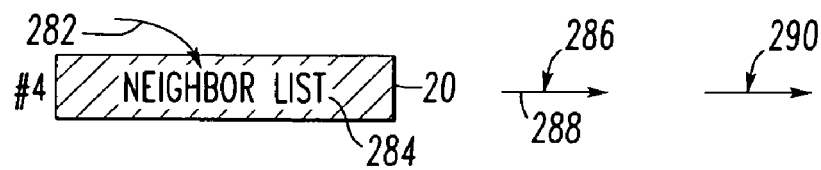

Then (FIG. 6E), the MAC layer 8 requests with Buffer Request message 272 a new "Other" buffer (e.g., buffer 20) from the BME 2, in order to collect the various (neighbor) discovery responses, such as MAC Beacons, extract information therefrom and form the Neighbor List 284 (FIG. 6I).

Next (FIG. 6F), the BME 2 checks if a buffer (e.g., buffer 20) is available and if there is at least one transmit buffer (e.g., buffer 18). When the BME 2 grants, at return event 274, the Buffer Request message 272, it returns the buffer number 276.

Then (FIG. 6G), upon transmission of the Beacon Request 266 (FIG. 6E), the MAC layer 8 sends a Buffer Release message 278 to the BME 2, in order to release the "TX" buffer 18.

Next (FIG. 6H), when a beacon is returned, the MAC layer 8 copies, at 282 (FIG. 6I), the contents 280 from the PHY receive buffer 14, in order to begin to build a neighbor list 284 (which will be sent to the network layer 6 when complete). The MAC layer 8 continues to collect beacon messages 280 until the neighbor list 284 is complete. The MAC layer 8, then, fills the "Other" buffer 20 with the completed list. The MAC layer 8, then, issues a MCPS_DATA.indication primitive 286 to the network layer 6, indicating the buffer number 288 (e.g., #4) and handing control (ownership) of the buffer 20 to the network layer 6. The network layer 6 removes the stored data of the neighbor list 284 from the "Other" buffer 20 that was indicated to it. Upon completion of reading that neighbor list 284, the network layer 6 releases, at BME_ReleaseBuffer event 290, the "Other" buffer 20 back to the BME 2.

EXAMPLE 17

If conflicts arise (e.g., too many requests from the layers 4,6,8 to the BME 2, but not enough buffers 12 are available), then the BME management mechanism stops since the quantity of buffers 12 is insufficient.

EXAMPLE 18

As an alternative to Example 17, the BME 2 sends a message to the requesting one of the layers 4,6,8 telling it to wait and try again. Hence, if the BME 2 denies that layer one of the buffers 12, then that layer may re-request a buffer at a later time.

EXAMPLE 19

The BME 2 may employ a queue (not shown) of requests from the various layers 4,6,8.

The BME 2 can act as a general-purpose memory allocation mechanism. The BME 2 does not employ a copy frame model or a linked list model. Instead, the buffers 12 are shared between all layers 4,6,8,10, thereby optimizing buffer usage. Message frames are never copied from a buffer of one of the layers 4,6,8,10 to the buffer of the next layer, thereby minimizing processing time. Hence, the BME 2 does not require complex management functionality.

Furthermore, the buffers 12 are independent of incoming and outgoing traffic flow. The pre-allocation of space for message headers is added by the lower layers (e.g., 6,8).

Although the exemplary BME 2 is implemented in software, the BME may be implemented in hardware and/or software.

The application layer 4, the network layer 6, the MAC layer 8, and the top part of the physical layer 10 are implemented in software, although these layers may be implemented in hardware and/or software. The bottom part of the physical layer 10 (e.g., the transceiver 84 of FIG. 3) is hardware.

Although the node 80 of FIG. 3 may be part of an ad-hoc, mesh type network, any suitable routing protocol or algorithm (e.g., DSR, Ad hoc on Demand Distance Vector (AODV), or proactive source routing (PSR)) may be employed. In a PSR routing technique, the NC appends a complete list of addresses from that source to the destination ND for downstream communications (from the NC). For multi-hop downstream communications, the receiving and repeating ND removes its address from the list of addresses from that ND to the next or destination ND. For upstream communications (toward the NC), the originating ND appends its address in the original message to an upstream node. For multi-hop upstream communications, the receiving and repeating ND appends its address to the list of addresses from that ND to the next upstream ND or to the NC.

EXAMPLE 20

FIG. 7 shows a portion of the LR-WPAN communication protocol stack 21 and the interface 22 to the transceiver 84 of FIG. 3. The radio hardware (e.g., Example 11) includes the physical radio 84B and the corresponding driver or RF-Engine 84A.

The function calls of the RF-Engine 84A include: (1) Initializing the radio 84B; (2) Turn on receiver; (3) Sending a packet; (4) Turn off the transceiver; and (5) Channel power. These functions are called in the PHY layer 10 to instruct the RF-Engine 84A, and pass various parameters and return other values.

There are also two callback functions that the RF-Engine 84A calls in the PHY layer 10. Those include: (1) Packet transmitted; and (2) Received packet indication.

For Initializing the radio 84B, the syntax is void RFME_InitRadio (RF_SETTINGS*settings). The RFME_InitRadio function performs the RF initialization using the parameters specified by the RF_SETTINGS data structure, which includes information about the structure of the required initialization information for the radio (e.g., Device address; CSMA on/off; Acknowledgment on/off).

For Turn on receiver, the syntax is void RFME_Receive (char*data, char maxlen). The RFME_Receive function puts the radio 84B in receive mode and provides a pointer to a memory location of the receive buffer. Any data received is stored in the memory location pointed to by data, with a maximum allowed length of maxlen. Upon data reception, the RF-Engine 84A invokes the RFME_PacketReceived function. The argument data is a Pointer to the RX buffer location. The argument maxlen is the Maximum allowable data length (Buffer size).

For Sending a packet, the syntax is void RFME_SendPacket(char*packetData, char length). The RFME_SendPacket function sends a packet using the current RF configuration, creates the CRC and attaches the same to the end of the packet. After the entire packet including the CRC has been transmitted, the RF-Engine 84A invokes the RFME_PacketSent function to notify the higher layer that the packet has been sent. The arguments include packetData, which his a pointer to the actual data to be transmitted, and length, which is the number of bytes to transmit (e.g., a maximum of 253).

For Turn off the transceiver, the syntax is void RFME_RadioOFF(void). The RFME_RadioOFF function is employed to put the radio in low power mode after which the radio 84B may go back to receive or transmit upon selection of the appropriate RFME function. This function does not employ any arguments.

For Channel power, the syntax is char RFME_ChannelEnergy(void). The RFME_ChannelEnergy function measures the energy in the current channel and returns the measured energy value to the PHY layer 10. The radio 84B provides the CSMA function, although this may be turned-on or off based on requirements. If CSMA is turned off, then this function is not used, although, for testing purposes, it may be employed. This function does not require any arguments and provides a return value of RFME_ChannelEnergy, which is the channel energy.

The CallBack Function, Packet transmitted, employs the syntax void RFME_PacketSent (status char). The RFME_PacketSent function informs the PHY layer 10 that the packet has been sent, if the transmission was successful or not, and the reason for an unsuccessful packet transmission. The argument is status which returns the status of the data transmission as shown by Table 8.

TABLE 8

| Value | Meaning |
|---|---|
| 0x00 | SUCCESS |
| 0x01 | NO_ACK |
| 0x02 | CHANNEL_ACCESS_FAILURE |
| 0x03-0xFF | reserved |

For Received packet indication, the syntax is void RFME_PacketReceived(char RSSI, char ReceivedLen). The RFME_PacketReceived function notifies the higher layer when an entire packet has been correctly received, indicates to the higher layer what the received signal strength, and provides the length of the received packet. The upper layer is only notified if the received packet is intended for the local device and may automatically acknowledge the received packet depending on the setting provided by rsettings. This function verifies correctness of the received data packet using the CRC. The received packet is placed in the memory location pointed to by data provided by the RFME_Receive function without the CRC value attached. The arguments include RSSI, which is the signal strength of the received packet, and ReceivedLen, which is the actual number of bytes received (i.e., ReceivedLen<=maxlen).

EXAMPLE 21

The disclosed network protocol stack 21 is employed as the core of a low-rate wireless network (LR-WPAN) (e.g., IEEE 802.15.4). The complete stack 21 is implemented in a minimal footprint (e.g., an 8-bit microprocessor with less than 32 Kbytes of ROM space and less than 2 Kbytes of RAM), which is very advantageous in cost sensitive applications.

EXAMPLE 22

The design of the protocol stack 21 also allows the network to be highly scalable, in order to support networks consisting of hundreds of nodes (e.g., a theoretical limit of $2^{64}$ nodes). The network protocol stack 21 is scalable for low-rate wireless applications of a wide range of sizes. The number of nodes in such potential applications ranges from two to well over 1000. In other words, the stack 21 is specially designed to be independent of the size of the wireless network.

EXAMPLE 23

The network protocol stack 21 supports the BME 2 that provides data buffer management services to other modules, such as the layers 4,6,8,10. The data buffers 12 are used for both transmit and receive purposes. Communication logistics, such as memory management and event queue management, are managed by the QF 1. This requires considerably less effort to develop new modules intended for future low-rate applications.

EXAMPLE 24

The network protocol stack 21 is highly portable to any suitable low-rate radio and microprocessor hardware. This enables minimal changes to the QF 1 and RF HW abstraction 22. All core stack software modules are completely independent of hardware that the stack 21 runs on. This is achieved using pure ANSI C software based on model-based software design without incurring the overhead of Java like languages. The stack 21 is, thus, adapted to run on different radio frequency (RF) hardware and microprocessor platforms. This involves very minimal porting and testing effort for quick introduction of new products.

EXAMPLE 25

The QF 1 permits platform independence, since the network protocol stack 21 is adapted to run on different RF hardware and microprocessor platforms (e.g., low-rate radio and microprocessor hardware).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of network communication, said method comprising:
    employing a communication network protocol stack comprising a plurality of independent communication layers providing a plurality of different corresponding services;
    employing a plurality of communication buffers;
    employing a buffer manager for said communication buffers, said buffer manager being independent of said independent communication layers;
    employing an application framework providing asynchronous communications among said buffer manager and said independent communication layers; and
    for a plurality of pairs of said buffer manager and one of said independent communication layers and for a plurality of pairs of said independent communication layers, subscribing by said buffer manager and by said independent communication layers to a plurality of events through said application framework and publishing by said buffer manager and by said independent communication layers a plurality of corresponding events through said application framework.

2. The method of claim 1 further comprising
    publishing by one of said independent communications layers an indication to another one of said independent communication layers through said application framework.

3. The method of claim 1 further comprising
    publishing by one of said independent communications layers a request to said buffer manager through said application framework; and
    publishing by said buffer manager a response to said one of said independent communications layers through said application framework.

4. The method of claim 1 further comprising
    subscribing by said buffer manager to a request from one of said independent communications layers through said application framework; and
    subscribing by said one of said independent communication layers to a response from said buffer manager through said application framework.

5. The method of claim 1 further comprising
    subscribing by said buffer manager to a request from one of said independent communications layers through said application framework;
    publishing said request from said one of said independent communications layers through said application framework to said buffer manager;
    subscribing by said one of said independent communication layers to a response from said buffer manager through said application framework; and
    publishing said response from said buffer manager through said application framework to said one of said independent communications layers.

6. The method of claim 5 further comprising
    including with said request a buffer request for a transmit buffer or a receive buffer of one of said communication buffers.

7. The method of claim 5 further comprising
    including with said response an identification of one of the communication buffers from the buffer manager.

8. The method of claim 5 further comprising
    including with said request a buffer release to release one of said communication buffers.

9. The method of claim 1 further comprising
    subscribing by one of said independent communications layers to an indication from another one of said independent communication layers through said application framework; and
    publishing said indication from another one of said independent communications layers through said application framework to said one of said independent communication layers.

10. The method of claim 1 further comprising
    employing with each of said independent communication layers an independent software module.

11. The method of claim 1 further comprising
    employing as said independent communication layers a medium access control (MAC) sub-layer, a network layer and an application layer.

12. The method of claim 1 further comprising
    employing with each of said independent communication layers and said buffer manager an independent software module.

13. The method of claim 1 further comprising
    employing as some of said communication buffers a plurality of transmit and receive communication buffers.

14. The method of claim 1 further comprising
    asynchronously communicating said publishing directly to said application framework from one of said independent communication layers; and
    asynchronously communicating said publishing directly from said application framework to another one of said independent communication layers.

15. A node comprising:
    a processor comprising a memory, a transceiver, a communication routine and an application framework,
    wherein said memory includes a plurality of communication buffers,
    wherein said communication routine includes a buffer manager adapted to manage said communication buffers, a plurality of independent communication layers and a physical layer associated with said transceiver, said buffer manager being independent of said independent communication layers,
    wherein said application framework provides asynchronous communications among said buffer manager and said independent communication layers, and
    wherein for a plurality of pairs of said buffer manager and one of said independent communication layers and for a plurality of pairs of said independent communication layers, said communication routine subscribes to a plurality of events by said buffer manager and said independent communication layers through said application framework and publishes a plurality of corresponding events by said buffer manager and by said independent communication layers through said application framework.

16. The node of claim 15 wherein said physical layer includes a wireless transceiver interface; and wherein said transceiver is a wireless transceiver.

17. The node of claim 15 wherein said communication routine further includes a radio frequency hardware abstraction; wherein said physical layer communicates directly with said radio frequency hardware abstraction; and wherein said radio frequency hardware abstraction communicates with said transceiver.

18. The node of claim 15 wherein said node is an LR-WPAN node and said transceiver is a wireless transceiver.

19. The node of claim 15 wherein said node is a network device.

20. The node of claim 15 wherein said node is a network coordinator.

* * * * *